US012709089B2

(12) United States Patent
Cooper et al.

(10) Patent No.: US 12,709,089 B2
(45) Date of Patent: Aug. 18, 2026

(54) MULTI-LAYER SELF-HEALING APPARATUSES AND METHODS

(71) Applicant: The Board of Trustees of the Leland Stanford Junior University, Stanford, CA (US)

(72) Inventors: Christopher B. Cooper, Palo Alto, CA (US); Zhenan Bao, Stanford, CA (US); Samuel E. Root, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 154 days.

(21) Appl. No.: 18/418,077

(22) Filed: Jan. 19, 2024

(65) Prior Publication Data

US 2024/0246327 A1 Jul. 25, 2024

Related U.S. Application Data

(60) Provisional application No. 63/440,656, filed on Jan. 23, 2023.

(51) Int. Cl.
*B32B 27/06* (2006.01)
*B32B 27/08* (2006.01)
(Continued)

(52) U.S. Cl.
CPC .............. *B32B 33/00* (2013.01); *B32B 27/06* (2013.01); *B32B 27/08* (2013.01); *B32B 27/283* (2013.01); *B32B 27/285* (2013.01); *B32B 2250/02* (2013.01); *B32B 2250/05* (2013.01); *B32B 2250/24* (2013.01); *B32B 2250/40* (2013.01); *B32B 2264/102* (2013.01); *B32B 2264/108* (2013.01); *B32B 2307/762* (2013.01); *B32B 2457/00* (2013.01); *B32B 2457/16* (2013.01)

(58) Field of Classification Search
CPC ......... B32B 33/00; B32B 27/06; B32B 27/08; B32B 27/283; B32B 27/285; B32B 2250/02; B32B 2250/05; B32B 2250/24; B32B 2250/40; B32B 2264/102; B32B 2264/108; B32B 2307/762; B32B 2457/00; B32B 2457/16
See application file for complete search history.

(56) References Cited

U.S. PATENT DOCUMENTS

2015/0343749 A1* 12/2015 Mather .................. B32B 37/06 525/216

FOREIGN PATENT DOCUMENTS

WO WO-2016132127 A2 * 8/2016 ............. B32B 15/08

OTHER PUBLICATIONS

Tan et al. "Immiscibility in polystyrene/sulfonated polystyrene blends." Polymer 36.10 (1995): 1969-1973. (Year: 1995).*

(Continued)

*Primary Examiner* — John D Freeman
(74) *Attorney, Agent, or Firm* — Mueting Raasch Group

(57) ABSTRACT

In certain examples, methods and devices, such as a soft electronics device, involve or include a first layer and a second layer from among the plurality of immiscible polymer layers, with the first and second layers integrated with one another to form a multilayered self-healing laminate, characterized in that polymer material in the first layer and polymer material in the second layer are cooperatively capable of autonomously recovering from at least one of the first layer and second layer being misaligned.

21 Claims, 21 Drawing Sheets

(51) Int. Cl.
*B32B 27/28* (2006.01)
*B32B 33/00* (2006.01)

(56) References Cited

OTHER PUBLICATIONS

Kang, Jiheong, et al. "Tough and water-insensitive self-healing elastomer for robust electronic skin." Advanced Materials 30.13 (2018): 1706846.
Yanagisawa, Yu, et al. "Mechanically robust, readily repairable polymers via tailored noncovalent cross-linking." Science 359.6371 (2018): 72-76.
Döhler, Diana, et al. "Tuning the self-healing response of poly (dimethylsiloxane)-based elastomers." ACS Applied Polymer Materials 2.9 (2020): 4127-4139. Abstract Only.
Li, Cheng-Hui, et al. "A highly stretchable autonomous self-healing elastomer." Nature chemistry 8.6 (2016): 618-624.
Rao, Ying-Li, et al. "Stretchable self-healing polymeric dielectrics cross-linked through metal-ligand coordination." Journal of the American Chemical Society 138.18 (2016): 6020-6027.
Cooper, Christopher B., and Zhenan Bao. "Using periodic dynamic polymers to form supramolecular nanostructures." Accounts of Materials Research 3.9 (2022): 948-959.
Wojtecki, R., Meador, M. & Rowan, S. Using the dynamic bond to access macroscopically responsive structurally dynamic polymers. Nature Mater 10, 14-27 (2011). Abstract Only.
Son, Donghee, et al. "An integrated self-healable electronic skin system fabricated via dynamic reconstruction of a nanostructured conducting network." Nature nanotechnology 13.11 (2018): 1057-1065.
Khatib, Muhammad, et al. "A multifunctional electronic skin empowered with damage mapping and autonomic acceleration of self-healing in designated locations." Advanced Materials 32.17 (2020): 2000246.
Khatib, Muhammad, Orr Zohar, and Hossam Haick. "Self-healing soft sensors: from material design to implementation." Advanced Materials 33.11 (2021): 2004190.
Khatib, Muhammad, et al. "A freestanding stretchable and multi-functional transistor with intrinsic self-healing properties of all device components." Small 15.2 (2019): 1803939. Abstract Only.
Cooper, Christopher B., et al. "Multivalent Assembly of Flexible Polymer Chains into Supramolecular Nanofibers." (2020).
Cooper, Christopher B., et al. "High energy density shape memory polymers using strain-induced supramolecular nanostructures." ACS Central Science 7.10 (2021): 1657-1667.
Faghihnejad, Ali, et al. "Adhesion and surface interactions of a self-healing polymer with multiple hydrogen-bonding groups." Advanced Functional Materials 24.16 (2014): 2322-2333.
Fujisawa, Yuta, et al. "Mechanically robust, self-healable polymers usable under high humidity: humidity-tolerant noncovalent cross-linking strategy." Journal of the American Chemical Society 143.37 (2021): 15279-15285. Abstract Only.
Neumann, Laura N., et al. "Dynamics and healing behavior of metallosupramolecular polymers." Science Advances 7.18 (2021): eabe4154.
Stukalin, Evgeny B., et al. "Self-healing of unentangled polymer networks with reversible bonds." Macromolecules 46.18 (2013): 7525-7541.
Shen, Zhiqiang, et al. "Sticky rouse time features the self-adhesion of supramolecular polymer networks." Macromolecules 54.11 (2021): 5053-5064.
Wool, RPa, and K. M. O'connor. "A theory crack healing in polymers." Journal of applied physics 52.10 (1981): 5953-5963.
Fetters, L. J., et al. "Connection between polymer molecular weight, density, chain dimensions, and melt viscoelastic properties." Macromolecules 27.17 (1994): 4639-4647. Abstract Only.
Cooper, Christopher B., et al. "Autonomous alignment and healing in multilayer soft electronics using immiscible dynamic polymers." Science 380.6648 (Jun. 2023): 935-941.

* cited by examiner

Intensity
1
0.01
0.1
q (Å$^{-1}$)
PPG-HB
PDMS-HB

Modulus (Pa)
$10^6$
$10^5$
$10^4$
$10^3$
$10^2$
20
60
100
140
Temperature (°C)
PPG-HB
PDMS-HB
G'
G"
G'
G"
Rheometer plates
Polymer
PTFE
Polymer Tensile Strength Recovery (%)
100
80
60
40
20
40
60
80
100
120
Temperature (°C)
PDMS-HB
PPG-HB
PDMS-HB:
PPG-HB Volume Fraction, $\phi_{PPG}$
Distance from Interface, z (nm)
50°C
70°C
100°C 24h at 70°C
Volume Fraction, $\phi_{PPG}$
Distance from Interface, z (nm)
50°C
70°C
100°C $\varepsilon_{AB}$
0.97
0.99
0.995
Volume Fraction, $\phi_B$
Distance from Interface, $z/R_g$ Equilibrated
$\varepsilon_{AB}$
0.995
0.99
0.97
Interfacial Width, $\xi/R_g$
Time ($M_\tau$)

FIG. 7A
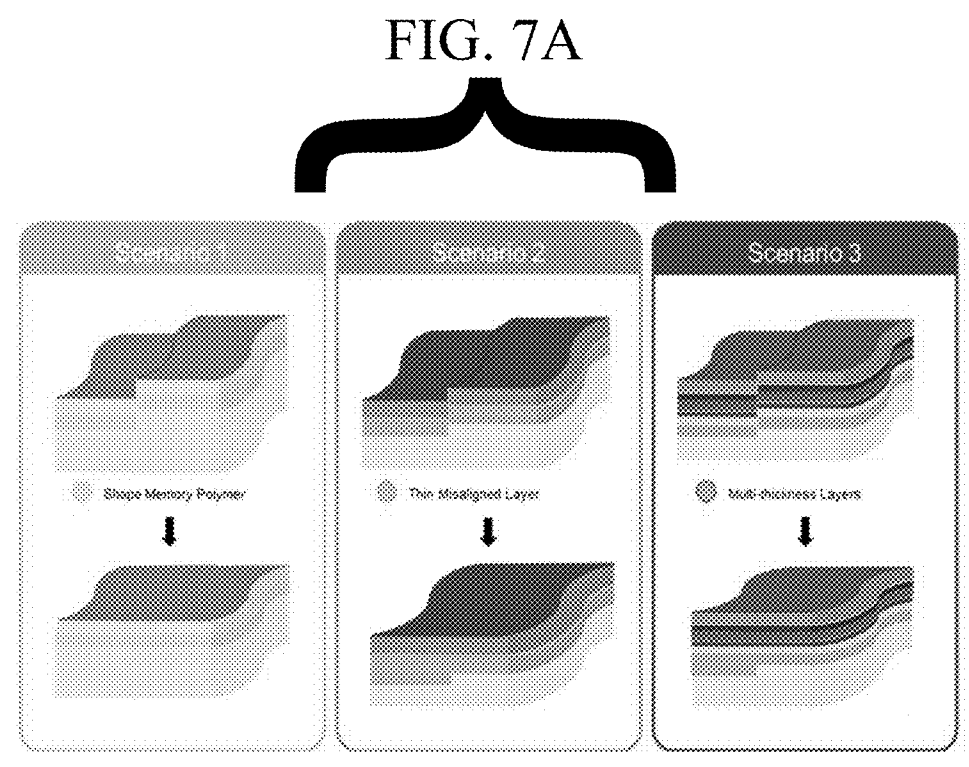
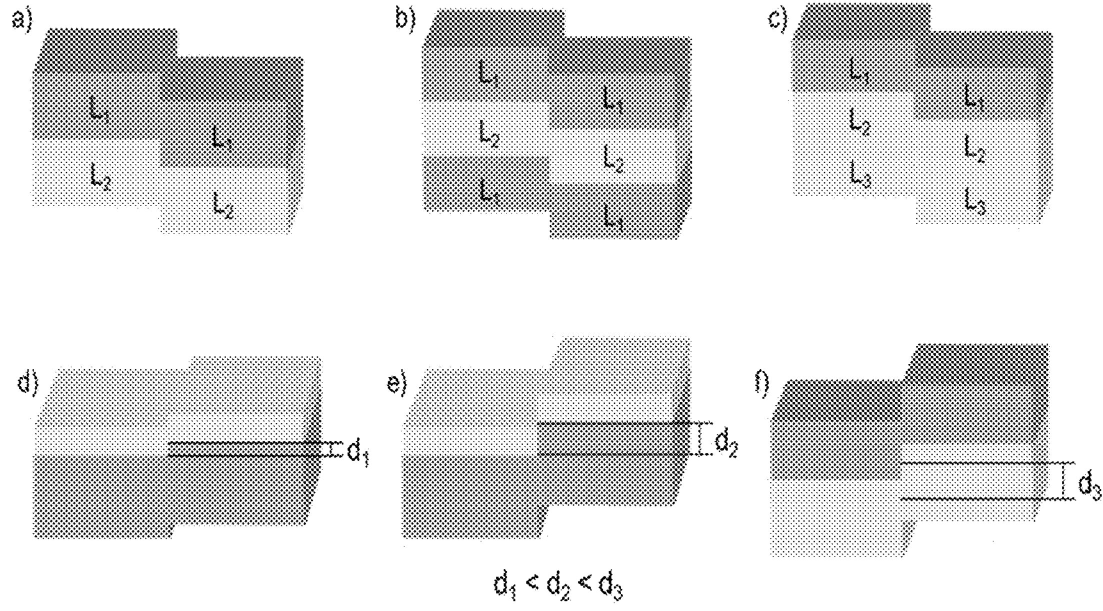
FIG. 7B

MULTI-LAYER SELF-HEALING APPARATUSES AND METHODS

FEDERALLY-SPONSORED RESEARCH AND DEVELOPMENT

This invention was made with Government support under contract W911NF-21-1-0092 awarded by the Department of Defense. The Government has certain rights in the invention.

BACKGROUND

Aspects of the present disclosure are related generally to manufactured materials, such as via a synthesized composite or polymer network, capable of self-healing.

Referring to the utilization of soft electronic devices as an exemplary technology type for case of discussion, it has been appreciated that for such devices, self-healing functionality provides a mechanism for repairing the devices from various forms of damage such as punctures, scratches, and slices to improve device robustness and lifetime. Different types of self-healing polymers in this context have employed various dynamic bonds, such as hydrogen bonding, metal-ligand coordination, or dynamic covalent bonds. As self-healing polymers may be implemented as insulating materials, to make functional electronic devices, they have been embedded with conductive or dielectric materials (e.g., particles, nanowires, nanotubes, flakes, etc.) using a composition that balances achieving the desired bulk electrical properties, while retaining the soft mechanical properties of the self-healing polymer matrix. Importantly, these self-healing composites can not only recover their original mechanical properties upon thermal healing, but can also recover electrical conductivity.

Self-healing, soft electronic sensors, as a subject of research, include self-healing strain sensors, self-healing electronic devices including electronic skin, aquatic skin, field-effect transistors, battery-based sensors, and advanced multifunctional sensing platforms. As the complexity of these and other devices has increased, it may be important for self-healing to simultaneously occur between multiple layers which have different respective functions (e.g., energy-storing (capacitive) versus insulative functions). Notwithstanding some advancements through such research of self-healing device (e.g., electronic skin with integration of multiple functional components), in some of the more successful endeavors have reported thick layers, and careful manual alignment has been needed to ensure functional self-healing between all layers. A similar problem was recently encountered for self-healing transistors, which saw a decreased drain current by almost one order of magnitude after healing, due to imperfect alignment of the source and drain electrodes.

Further, previous demonstrations of self-healing devices have required manual alignment after damage to properly align different functional components (or layers) and/or layer-specific uses. This issue stems from the use of only a single type of self-healing polymer throughout the device. While using the same polymer for all functional components ensures strong adhesion between all layers, there is no selectivity for different functional components to "recognize" each other during healing and self-align to enable functional recovery of the device.

SUMMARY OF VARIOUS ASPECTS AND EXAMPLES

Various examples/embodiments presented by the present disclosure are directed to issues such as those addressed above and/or others which may become apparent from the following disclosure. For example, some of these disclosed aspects are directed to methods and devices (e.g., user wearable, electronic component, material-defined structure as a set of integrated layers, etc.) that use or leverage from integrating first and second immiscible polymer layers to form a (multilayered) self-healing structure (sometimes referred to as "laminate" as implied by having at least first and second layers) in which the respective polymers cooperate for autonomous recovery from a misalignment of the first layer relative to the second layer and/or damage from one of the layers. Given the polymers-based composition(s), such a laminate may be rigid or non-rigid (e.g., bendable) and may be constructed in any of a variety of different shapes.

In connection with specific types of examples, the present disclosure, benefits, advantages and practical improvements are provided over existing methods, apparatuses (e.g., devices, systems and/or materials) and these may include one or more of: layer-specific self-healing aspects to enable recovery of devices with multiple functional components.

Certain more-specific example aspects of the present disclosure are directed to using dynamic polymers with immiscible backbones which create an interfacial tension gradient at the interface and enable autonomous re-alignment of different layers during the healing process. Embedding the polymer layers with different composites can endow layer-specific functionality, while preserving the ability for autonomous re-alignment.

In certain examples of methods and devices (e.g., soft electronics devices), the present disclosure is directed to use of (or includes in the case of a device) a first layer and a second layer from among the plurality of immiscible polymer layers, with the first and second layers integrated with one another to form a self-healing laminate, characterized in that polymer material in the first layer and polymer material in the second layer are cooperatively capable of autonomously recovering from at least one of the first layer and second layer being misaligned.

In connection with other more specific examples, there are numerous further exemplary aspects of the present disclosure which may build on one or more of the above characterizations. For example, such exemplary aspects may include: using the first and second layers (e.g., among others) as part of a laminate or film with form-changing features (e.g., being flexible and/or stretchable) for use as part of a user-wearable, a user-attachable device, or an implantable electronics device with high durability and self-healability.

In certain other examples which may also build on one or more of the above-discussed aspects, methods and devices are directed to the immiscible polymers of the first and second layers in that the laminate have: a common bond that enhances interlayer adhesion; the same backbone, but different dynamic bonds or different arrangements of dynamic bonds; respectively different immiscible backbones; configurations/compositions that cooperate by providing interfacial tension-mediated realignment in response to said certain of the immiscible polymer layers becoming misaligned; polymer blends that manifest autonomous recovery, in response to at least one of: being damaged, and being misaligned; in at least one of the first and second layers other material (e.g., a carbon nanotube, a nanowire, and another polymer nanostructure); and in at least one of the first and second layers, an immiscible backbone polymer that is amorphous with low glass transition temperatures and that mitigates or prevents nanoscale aggregation.

According to other specific examples related to the above methodology and/or devices, a plurality of immiscible polymer layers, among which are a first layer and a second layer, are integrated with one another to form a self-healing laminate. The self-healing laminate is characterized in that the polymer material in the first layer and polymer material in the second layer are cooperatively capable of recovering from at least one of the first layer and second layer being misaligned by autonomously recovering from being misaligned and from at least one of the first layer and second layer being damaged.

According to yet other specific examples, a method (of use of one of the above-characterized aspects or devices, or of manufacture), includes providing a plurality of immiscible polymer layers including a first layer and a second layer integrated with one another to form a self-healing laminate; and using the self-healing laminate in an environment that subjects at least one of the first layer and second layer to being misaligned and continuing to use the self-healing laminate in response to the self-healing laminate autonomously recovering from being misaligned.

According to another related aspect (which may stand alone or also build on the above aspects), the present disclosure concerns aspects of the recovery from a misaligned and/or damaged situation. In one such example, the first layer and the second layer are immediately-adjacent layers among the plurality of immiscible polymer layers, and the first layer and the second layer, collectively, manifest structural integrity in a first non-damaged state, and in response to being damaged, manifest a recovery state followed by a recovered state, wherein in the recovered state the first layer and the second layer maintain the structural integrity.

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with exemplary embodiments of the present disclosure, in which:

FIGS. 7A and 7B respectively represent multi-layer structures in a set of scenarios (1, 2 and 3 of FIG. 7A) with systematically tuned orthogonality and layer thickness (FIG. 7B (delineated "a), "b)" etc. through "f)")

Figures 1A, 1B:
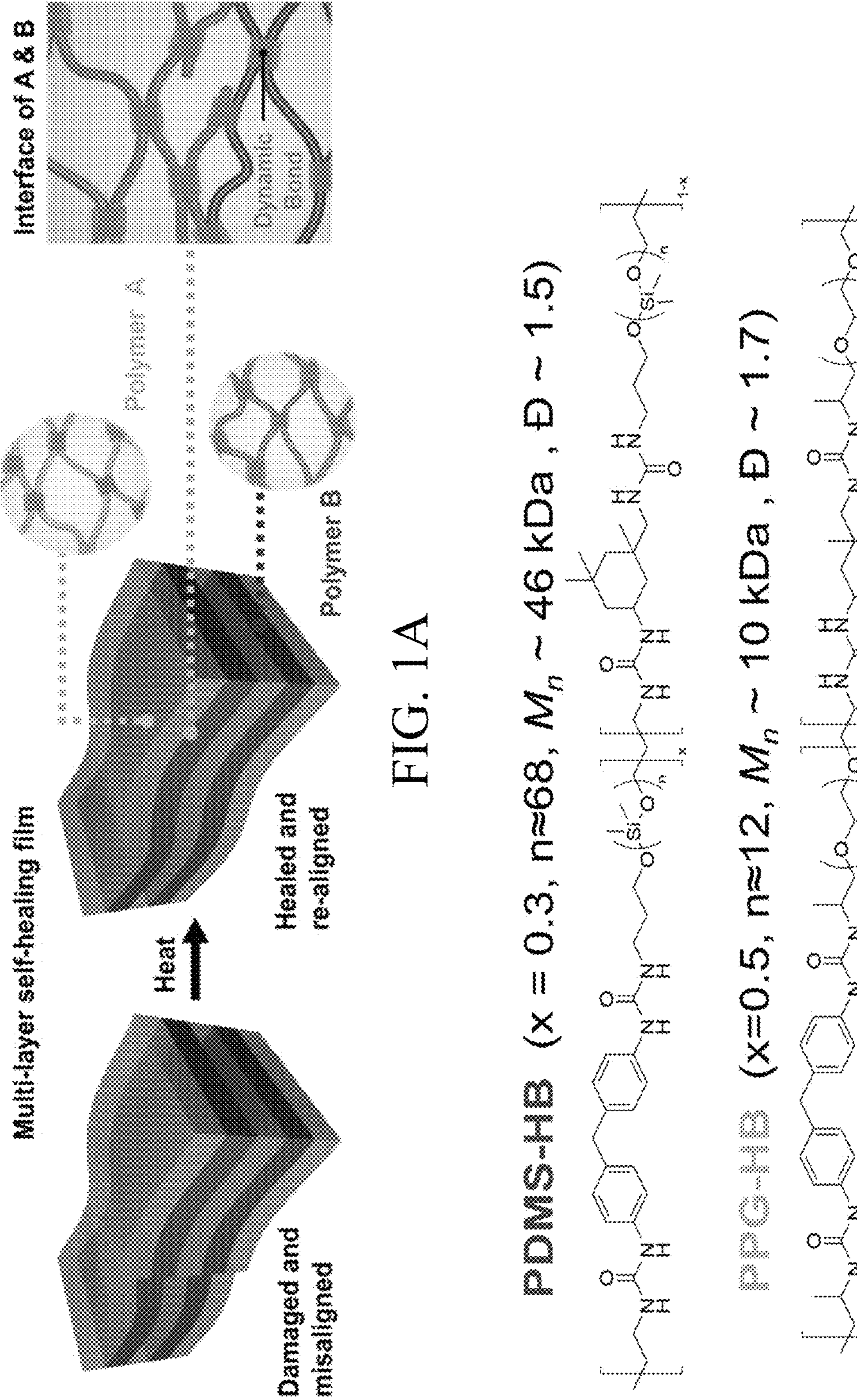
FIGS. 1A-1N show aspects of design and characterizations of dynamic polymers used in a specific example experimental embodiment with: a schematic of an example film (FIG. 1A), examples of chemical structures (FIG. 1B), plots of aspects related to the dynamic polymers (FIGS. 1C and 1D), a schematic of the experimental set up (FIG. 1E), further plots of aspects related to the dynamic polymers (FIGS. 1F, 1G and 1H), and optical microscope images (FIGS. 1I, 1J, 1K and 1L, FIG. 1M and FIG. 1N)

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving devices characterized at least in part by a laminate of polymer-based layers capable of self-healing autonomously in response to one layer becomes misaligned relative to another layer. While the present disclosure is not necessarily limited to such aspects, an understanding of specific examples in the following description may be understood from discussion in such specific contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For case of illustration, the same connotation and/or reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In exemplary aspects, the present disclosure is directed to a plurality of immiscible polymer layers, including at least first and second layers being integrated with one another to form a self-healing laminate. The laminate is characterized in that polymer material in the first layer and polymer material in the second layer are cooperatively capable of autonomously recovering from at least one of the first layer and second layer being misaligned.

Consistent with the above aspects, such a manufactured device or method of such manufacture may involve aspects presented and claimed in U.S. Provisional Application Ser. No. 63/440,656 filed on Jan. 23, 2023 (STFD.450P1 S23-010) with an Appendix (with citations to background publications), to which priority is claimed. To the extent permitted, such subject matter is incorporated by reference in its entirety generally and to the extent that further aspects and examples (such as experimental and/more-detailed embodiments) may be useful to supplement and/or clarify.

Certain specific examples according to the present disclosure are advantageous in that a self-healing polymer-based laminate structure is composed of materials that cooperate to enable the laminate to recover autonomously from various forms of damage. Further, in certain-related specific examples also according to the present disclosure, conductive or dielectric particles may be embedded within the polymer-based materials (or simply "polymers") used in the laminate structure to extend its functionality. These polymers may be arranged into a multilayer configuration, in which each layer (or a plurality of the layers) is dedicated to at least one specific function. In such examples, the (e.g., all) layers of the laminate may be made with the same type of polymer to ensure strong interlayer adhesion. Further, in addition to such polymers being formed to successfully self-heal when one or more of the layers are damaged, to reduce or eliminate efficacy of the healing process due to even the slightest misalignment of the layers (e.g., due to being damaged or otherwise misaligned in a step of manufacture, and possibly or more than likely associated with risking a loss of functionality), certain examples according to the present disclosure implement the laminate as immiscible dynamic polymer-based layers to create a self-healing polymer laminate with autonomous realignment ability. Adjacent layers may be constructed with immiscible dynamic polymers with the same dynamic bond, ensuring interlayer adhesion (e.g., different backbones for interfacial tension-mediated realignment after damage). In experimental and more-detailed examples, layers of the laminate are created using polymer blends to achieve a full self-directed structural and functional recovery after damage.

In certain exemplary embodiments according to the present disclosure, a self-healing laminate (e.g., as above with polymer material in the first layer and polymer material in the second layer being cooperatively adapted to recover autonomously for re-alignment), the immiscible polymers of the first and second layers in the laminate have: a common bond that enhances interlayer adhesion; the same backbone, but different dynamic bonds or different arrangements of dynamic bonds; respectively different immiscible backbones; configurations/compositions that cooperate by providing interfacial tension-mediated realignment in response to said certain of the immiscible polymer layers becoming misaligned; polymer blends that manifest autonomous recovery, in response to at least one of: being damaged, and being misaligned; having additional particles/material in at least one of the first and second layers other material (e.g., a carbon nanotube, a nanowire, and another polymer nanostructure); and in at least one of the first and second layers, having an immiscible backbone polymer that is amorphous with low glass transition temperatures and that mitigates or prevents nanoscale aggregation.

Certain specific example implementations of the present disclosure are directed to soft devices such as electronic appliances (housings, substrates, circuit elements, displays including capacitive touch displays, etc.). As such devices are susceptible to damage by sharp objects, according to exemplary aspects of the present disclosure, synthetic composites in layers of the self-healing laminate are made from networks of soft dynamic polymers embedded with conductive nano-micro particles which facilitate capability of mechanically and electrically healing after damage. While studies have focused on healing of a single type of polymer network, practical, example implementations according to the present disclosure take into account the limitations of electronic devices that consist of thin-film multilayer structures where manual alignment of individual device layers is impractical. Accordingly, certain examples of the present disclosure are directed to a pair of model dynamic polymers, which have immiscible polymer backbones but identical dynamic bonding units to enable autonomous self-alignment and healing in soft electronic devices. Also according to the present disclosure, a combination of experiments, coarse-grained molecular dynamics simulations, and self-consistent field theory reveals that these immiscible polymers exhibit a weakly interpenetrating and adhesive interface, whose width is dynamic and tunable with annealing temperature. Moreover, even when multi-layer laminates of these polymers are misaligned after damage, these structures autonomously re-align during healing to minimize interfacial tension between the polymers, which is a phenomena that has also been observed in simulations according to the present disclosure. Broad utility of this approach has been demonstrated via aspects of the present disclosure including fabricating composite devices with conductive, dielectric, and magnetic particles that functionally heal after damage, enabling thin film pressure sensors, magnetically assembled soft robots, and underwater circuit assembly.

In yet more specific aspects, a multilayered self-healing device includes a pair of self-healing polymers with the same dynamic bonds and with immiscible polymer backbones. The polymers exhibit significantly-reduced interfacial healing dynamics compared to self-healing of the same polymers, allowing for autonomous self-recognition during the healing of multilayer devices. When misaligned after damage, these multilayer structures possess surface tension gradients that drive directional chain diffusion to enable realignment. On the other hand, the similar dynamic bonds between the polymers enable strong interfacial adhesion between the otherwise immiscible layers. Using the immiscible dynamic polymers, the experimentation efforts resulted in the preparation of conductive and insulating composites to form thin film capacitors which readily self-heal after mechanical damage. The minimal interlayer diffusion between the polymers also prevents diffusion of the embedded particles, which preserves each layer's electronic function.

According to other aspects of the present disclosure, aspects concerning the autonomous recovery from a misaligned and/or damaged situation may be best understood with reference to one or more example illustrations. Among others, illustrations provided in FIG. 1A, FIGS. 3A-3G and FIGS. 7A and 7B provide such example illustrations. Using the simpler illustrations of FIG. 1A and FIGS. 3A-3G, first and second layers are shown to be immediately-adjacent one another and among a plurality of immiscible polymer layers. The right portion of FIG. 1A (and FIG. 3A) show the immiscible polymer layers in one state which corresponds to the layers being aligned (horizontally along a plane parallel to an interfacial region integrating the first and the second layers) and undamaged. In this state, the laminate manifests structural integrity. A state corresponding to the structure being damaged is shown in the left portion of FIG. 1A, and in FIG. 3B. The capability of the laminate to autonomously recover from the damaged state is shown in FIG. 3C, and again in the right portion of FIG. 1A.

These example illustrations of the present disclosure relate to experimentation (e.g., proof-of-concept efforts) that demonstrates various aspects, which may be used alone or in combinations, and efficacy of operation. As one of many examples, these aspects may include self-healing structures constructed using one or more films of exemplary materials which have different functional uses and/or components (or layers), such as additives or other composition-related differences), and by autonomously self-healing and/or self-aligning, the functional uses may be readily validated such as by testing for satisfaction of performance criteria (e.g., specific to the functional use(s) such as component conductivity, capacitance, etc.) related to one or more of the functional uses. Some of these aspects and related advancements are discussed above and also below in the following more-detailed discussion of the figures which have realized impressive and surprising results stemming from these experimental efforts. In certain regards, the skilled artisan would recognize that such aspects and related advancements according to the present disclosure, open pathways for many applications; e.g., based on autonomous-recovery/self-assembly polymer materials via (molecular-level) self-recognition.

Figures 1C, 1D, 1E, 1F:
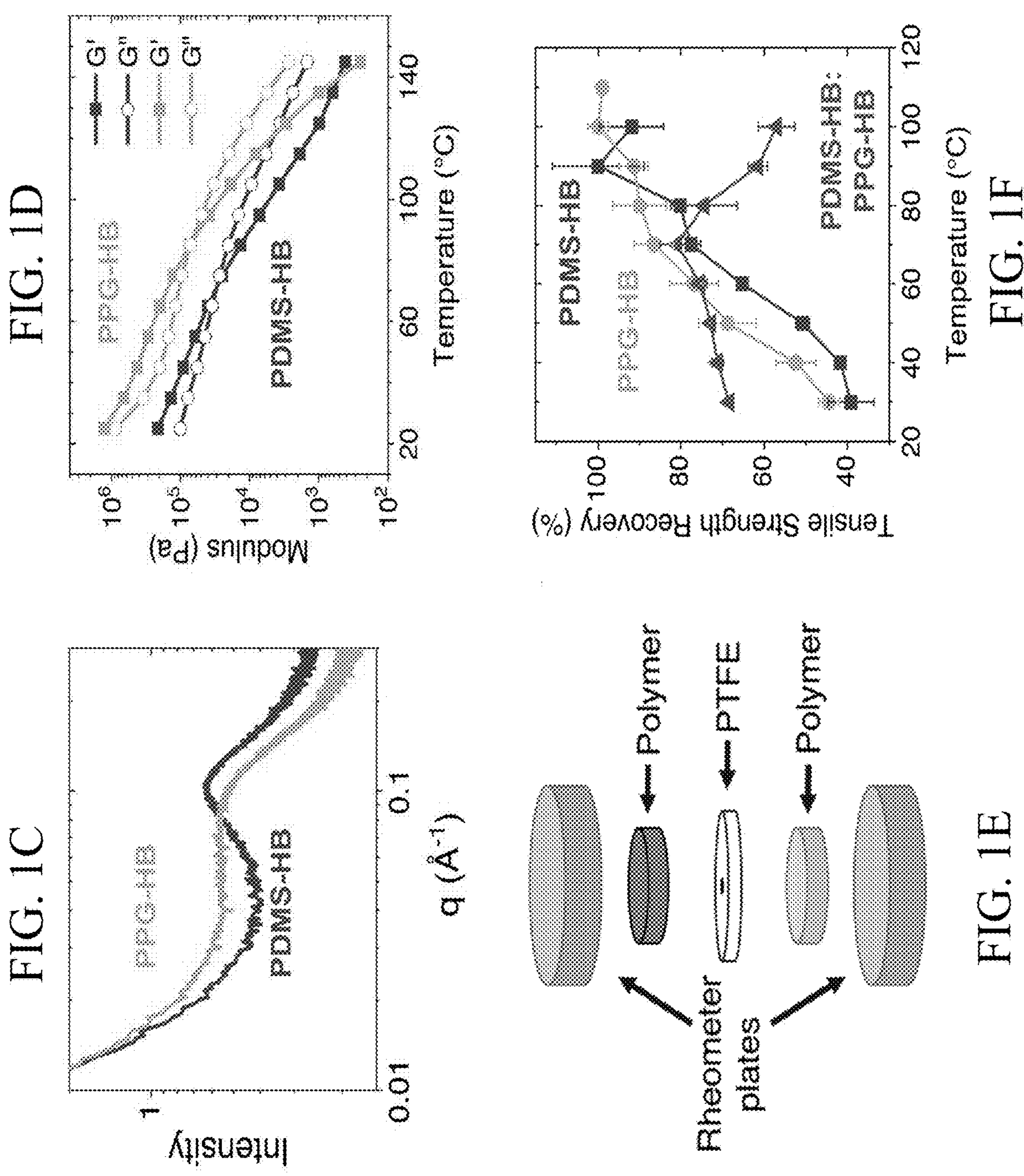

Turning now the illustrations of the present disclosure, FIGS. 1A-IN (collectively represented as FIG. 1) are useful for disclosing certain of these example experimental embodiments and impressive results. More particularly, FIGS. 1A-IN show aspects of design and characterizations of (e.g., dynamic) polymers used in a specific type of example experimental embodiment for which a schematic of an example film is shown in FIG. 1A (as discussed to some extent above). In connection with the polymers used to implement the experimental structure shown in FIG. 1A, examples of chemical structures are illustrated in FIG. 1B, and plots of aspects related to the dynamic polymers are shown in FIGS. 1C and 1D. FIG. 1E shows a schematic of the experimental set up, with further plots of aspects related to the polymers shown in FIGS. 1F, 1G and 1H. Further aspects are shown by way of FIGS. 1I, 1J, 1K and 1L (optical microscope images), and FIG. 1M and FIG. 1N.

More specifically, for example chemical structures, polydimethylsiloxane (PDMS) and polypropylene glycol (PPG) were used as model immiscible backbone polymers since they are both flexible, amorphous polymers with low glass transition temperatures ($T_{g,PDMS}$=−125 degrees celsius and $T_{g,PPG}$=75 degrees celsius) and have different bulk surface free energies ($\gamma_{PDMS}$≈22 mJ/m$^2$ and $\gamma_{PPG}$≈32 mJ/m$^2$). To minimize the effect of bulk film microstructure, a combination of bisurea bonds formed from both 4,4'-methylene bis(phenyl isocyanate) (MPU) and isophorone diisocyanate (IU) are incorporated into each polymer (cited in the above U.S. Provisional as producing amorphous, self-healing films and prevent nanoscale aggregation). For both synthesized polymers, the experimentation targeted healing dynamics within an casily accessible temperature window (30-100 degrees celsius) with solid-like properties at room temperature, which are necessary for device fabrication and stability. The PDMS-based polymer had a backbone molecular weight ($M_b$) of 5 kDa and an MPU:IU molar ratio of 0.3:0.7, hereafter denoted as PDMS-HB ($M_n$~46 kDa, Đ~1.5), and the PPG-based polymer had a $M_b$ of 0.75 kDa and an MPU:IU ratio of 0.7:0.3, hereafter denoted as PPG-HB ($M_n$~10 kDa, Đ~1.7)

The experimentation confirmed the lack of larger microstructures by small-angle x-ray scattering (SAXS) in both polymers, which gave characteristic domain spacings between 6-9 nm (FIG. 1C), as well as by atomic force microscopy (AFM). Moreover, both polymers exhibit terminal flow (as measured by G', G" crossover in rheological data) between 75-85 degrees celsius (FIG. 1D) and glass transition temperatures well-below room temperature ($T_{g,PDMS-HB}$<−90 degrees celsius, $T_{g,PPG-HB}$=−47 degrees celsius), which enables healing dynamics within an accessible experimental window. The experimentation efforts used PPG-HB with a lower $M_b$ by more than five times compared to PDMS-HB to achieve similar mechanical properties of the resulting polymers. This is consistent with previous work that has found that the oxygen in polyethers destabilizes hydrogen bond formation and nanophase separation in dynamic polymer films. The difference in surface energies between PDMS-HB (23 mJ/m$^3$) and PPG-HB (44 mJ/m$^3$) was experimentally confirmed using contact angle measurements with water, diiodomethane, and ethylene glycol to determine the polar and non-polar contributions.

Figure 1H:
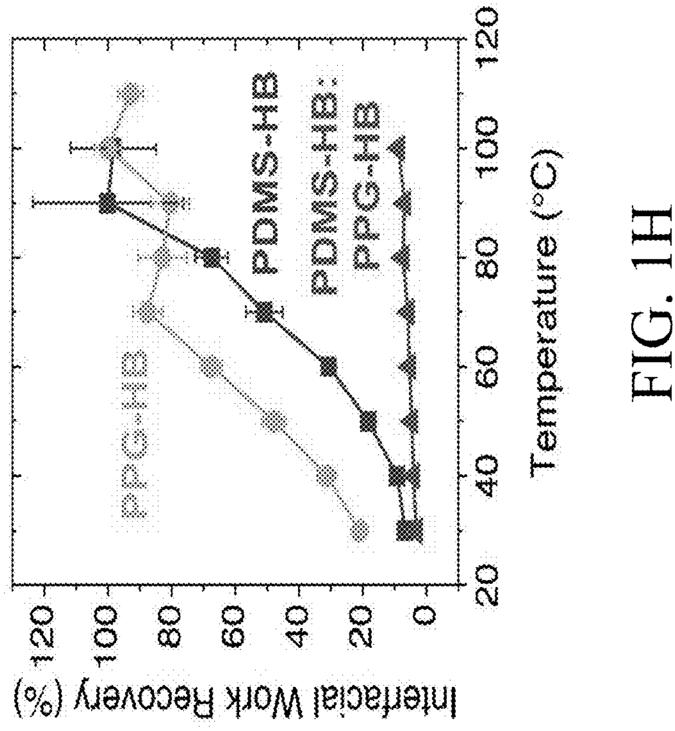
Figure 1G:
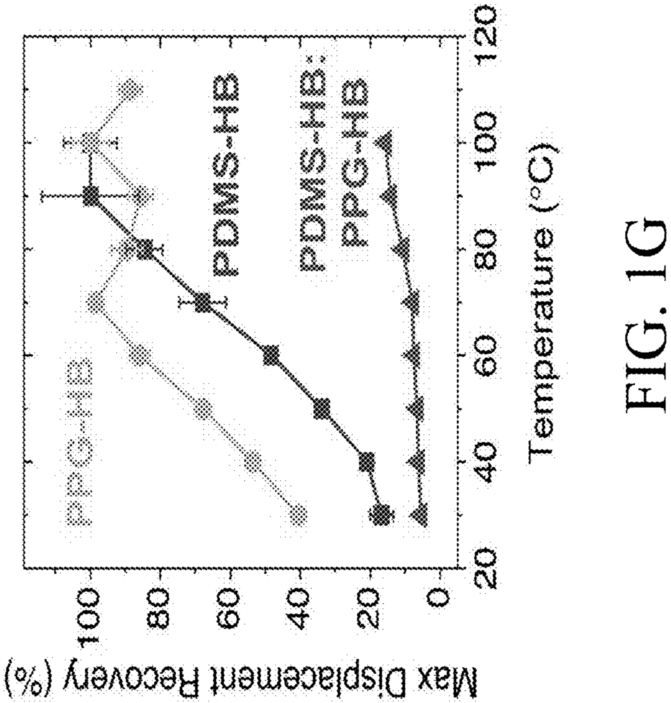
Figures 1I, 1J, 1K, 1L, 1M, 1N:
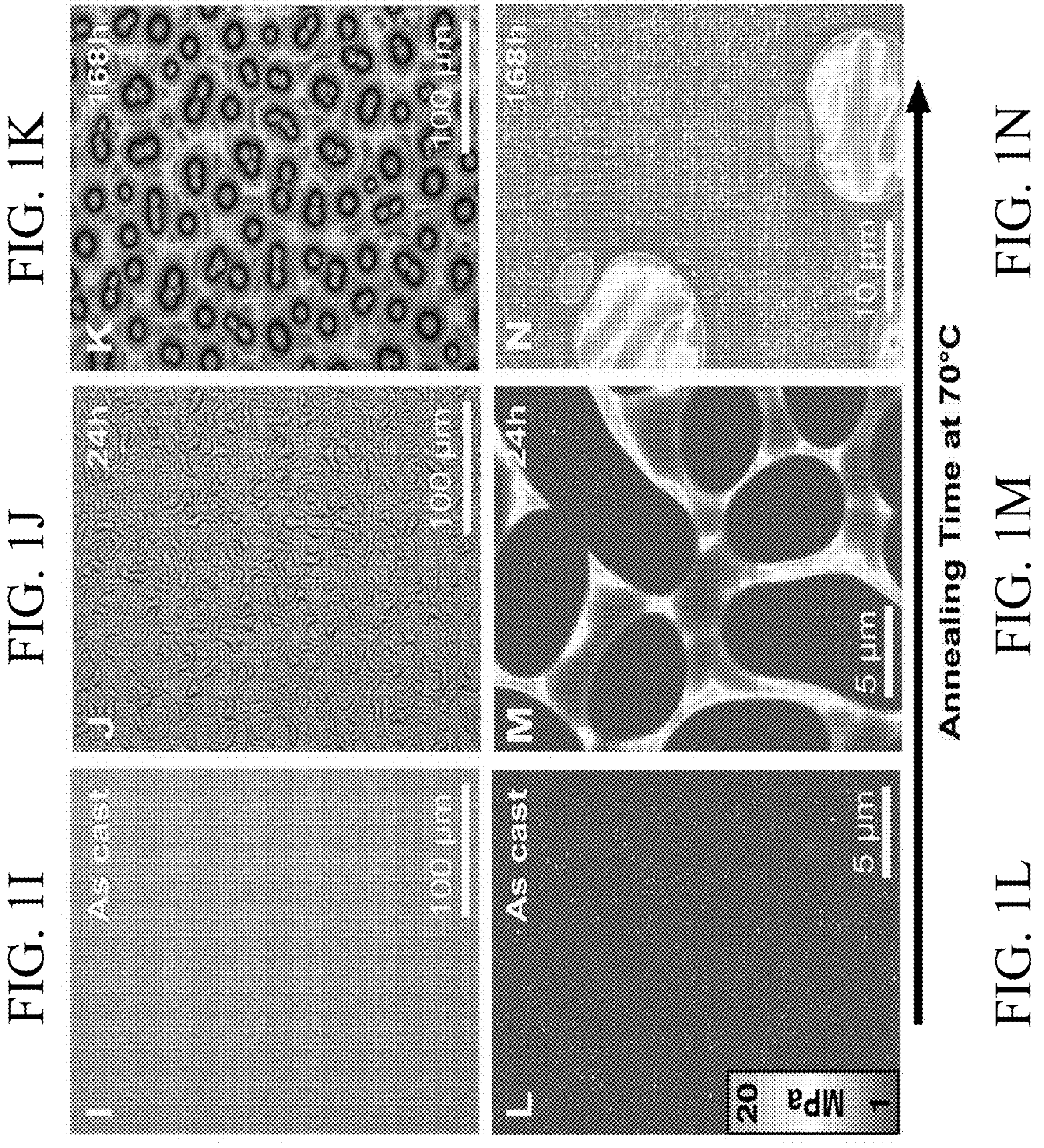

Other detailed aspects of FIGS. 1A-IN are directed to include design and characterization of dynamic polymers with immiscible backbones and identical hydrogen bonding units (PDMS-HB and PPG-HB). FIG. 1A shows schematics of the principle of surface-tension mediated re-alignment and healing of a fractured multi-layer laminate. The difference in surface energy between the two polymer backbones (type A and type B) drives re-alignment, while the dynamic bonds in both polymers promote interlayer adhesion for device performance. FIG. 1B shows chemical structures of the two immiscible dynamic polymers used in this experimental effort, PDMS-HB and PPG-HB. FIG. 1C plots small-angle x-ray scattering curves showing the amorphous structure of PDMS-HB (black line) and PPG-HB (grey line, or pink if viewed in color) with domain sizes of ~6-9 nm. FIG. 1D demonstrates rheological characteristics of PDMS-HB (black lower lines) and PPG-HB (grey upper lines, or pink if viewed in color) showing the crossover between the storage modulus (G', solid squares) and loss modulus (G", open circles) around 75-85° C.; this corresponds to the onset of terminal flow in the bulk materials. FIG. 1E is a schematic of one example experimental set up of the self- or interfacial healing between two polymers. FIGS. 1F-1H show the recovery in tensile strength (FIG. 1F), max displacement (FIG. 1G), and interfacial work (FIG. 1H), with the respective graph lines denoting self-healed PDMS-HB (black squares), self-healed PPG-HB (pink circles) and PDMS-HB healed with PPG-HB (purple triangles). Each point is averaged over 3 samples with a healing time of 30 minutes at the specified temperature. Optical microscope images are shown of a spin-coated film of PDMS-HB and PPG-HB (50 wt %) immediately after casting (I), and after annealing for 24 hours (FIG. 1J) and 168 hours (K) at 70 degrees celsius, and the corresponding QNM modulus images (FIGS. 1L-IN). Phase separation clearly increases with increased annealing time. The modulus of neat PDMS-HB and PPG-HB may be measured by QNM (the pink region (or grey region, if viewed as black and white image) as illustrated may be PPG-rich in certain example experimental/detailed embodiments as relating to the above examples).

The self-healing behavior of PDMS-HB and PPG-HB has been characterized with such experimentation by adapting a recently reported technique, where discs of polymer are healed on a parallel plate rheometer so that the contact area is consistently defined by a polytetrafluroethylene (PTFE) sheet with a hole (FIG. 1E). After curing, the plates are pulled apart at a constant rate to generate stress-displacement curves. The experimentation efforts repeated this process for different temperatures in 10 degrees celsius steps and monitored healing by tracking the recovery in the tensile strength (FIG. 1F), the max displacement (FIG. 1G), and the interfacial work (i.e., the area under the stress-displacement curve, FIG. 1H) as a function of healing temperature. In all cases, the experimentation efforts observe a plateau at higher temperatures indicative of full healing. Both PDMS-HB and PPG-HB are fully healed after 30 minutes at ~80-90 degrees celsius, consistent with their terminal flow onset temperatures (FIG. 1D). This is similar with recent experimental work studying interfacial healing of metallosupramolecular polymers as well as theoretical and computational predictions of self-healing polymers.

Next, the experimentation involves evaluating the interfacial healing between PDMS-HB and PPG-HB, where both polymers possess identical dynamic bonds but immiscible polymer backbones. Broadly, the self-healing of two polymeric interfaces involves wetting between the 2D interfaces and then creation of a 3D interphase that propagates with macromolecular diffusion and polymer re-entanglement to restore bulk properties. It has been found that for self-healing of metallosupramoelcular polymers, full healing was achieved only when the 3D interphase reached widths on the order of ~ 100 nm (see, e.g., Neumann, L. et al., S. Dynamics and Healing Behavior of Metallosupramolecular Polymers. *Sci. Adv.* 2021, 7 (18). From the experimentation efforts, another aspects of the present disclosure considers that the use of similar dynamic bonds would enable wetting of the 2D interface, while the difference in surface free energies between PDMS and PPG would limit the width of a 3D interphase, since macromolecular diffusion would be thermodynamically unfavorable, approaching the limiting case of two fully immiscible polymer blends. Compared to the self-healing cases, the PDMS-HB:PPG-HB interface exhibited significantly reduced healing, even at 100 degrees celsius when both samples exhibit rapid dynamics and liquid-like behavior. The tensile strength recovered almost immediately to ~70% of the PDMS-HB pristine interface, indicative of good wetting between the surfaces. However, both the max displacement and interfacial work recoveries remained an order of magnitude lower (<10%) than the healed samples with two pieces of identical polymers (FIG. 1F-1H).

These experimental results indicate that healing between the samples is thermodynamically restricted due to a lack of macromolecular diffusion across the interface. To further test this, during the experimentation efforts a film of PDMS-HB and PPG-HB (50 wt % blend) was spin-coated from a homogenous solution and then annealed the sample at 70 degrees celsius for various times. The experimentation efforts obtained optical microscope images and quantitative nanomechanical mapping (QNM) images of the sample immediately after spin-coating (FIG. 1L), after 24 hours of anncaling (FIG. 1J, 1M), and after 164 hours of anncaling (FIG. 1K, IN). The samples show clear and increasing phase separation with increased annealing, with coarsening occurring across all measured length scales. In the QNM images, contrast is measured by distinct differences in the modulus of the two polymers. The increased domain sizes and more distinct modulus differences with longer annealing times suggest that PDMS-HB and PPG-HB are thermodynamically immiscible. This explains the limited healing observed between PDMS-HB and PPG-HB. In addition, the experimentation efforts measured the interfacial healing between PDMS-HB and PPG-HB at 70 degrees celsius for longer healing times and showed that no additional healing occurred. This finding implies that the increased healing at higher temperatures observed in FIGS. 1G-1H arises not from faster polymer dynamics, but instead from increasing the miscibility of the two polymers at elevated temperature, which the experimentation efforts later confirm by modeling.

Figures 2A, 2B, 2C:
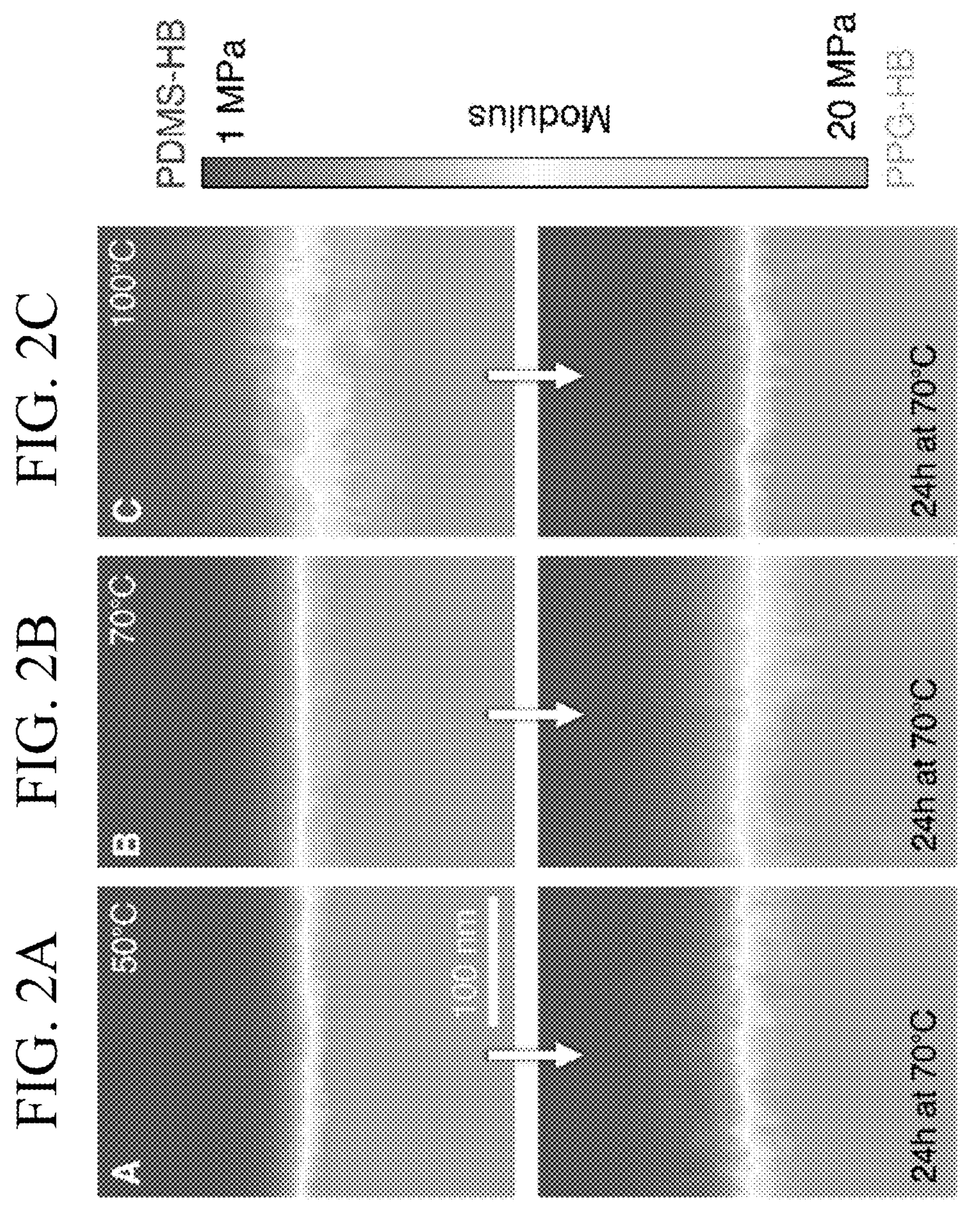
FIGS. 2A-2M show aspects of an interface between two immiscible dynamic polymer networks with identical dynamic bonds used in a specific example experimental embodiment with: images of a modulus gradient across the interfaces of a film shown at different temperatures (FIGS. 2A, 2B and 2C), respective plots of different temperatures/stages (FIG. 2D showing 50° C. with sharpest corners, and FIG. 2E showing 100° C. with least-sharp corners), images of coarse-grained molecular dynamics simulations for equilibrated interfaces (FIGS. 2F, 2G and 2H), plots of aspects of interfacial profiles obtained from the equilibrated simulations (FIG. 2I and FIG. 2J with key mapped to plots), a field-theoretic schematic (FIG. 2K), a graph showing further plots of interfacial profiles (FIG. 2L) and plots showing clustering of dynamic bonds at the interface with increasing repulsive interaction ($\chi_{AB}$) (FIG. 2M)

To further test this, the experimentation efforts characterized the interface between PDMS-HB and PPG-HB through a combination of experiments, simulation, and theory. The experimentation efforts first laminated two layers of PDMS-HB and PPG-HB together by hot-pressing at different temperatures and then measured QNM-AFM of fresh cut interfaces before and after annealing at 70 degrees celsius. Tracking the modulus revealed a clear interface between PDMS-HB and PPG-HB (FIGS. 2A-2C), whose width was measured quantitatively by fitting the data to a mathematical function (e.g., a sigmoidal function).

Before delving into such a function, it may be helpful to review more detailed aspects of FIGS. 2A-2M, which pertain to an exemplary interface between two immiscible dynamic polymer networks with identical dynamic bonds. These details are as follows. QNM images of the modulus gradient across the interfaces of bilayer films prepared by hot pressing at 50° C. (FIG. 2A) 70° C., (FIG. 2B) and 100° C. (FIG. 2C), before (top) and after (bottom) anncaling for 24 hours at 70° C. The higher modulus region corresponds to pure PPG-HB (pink or lower portion) and the lower modulus region corresponds to pure PDMS-HB (dark grey or upper portion). Fitted interfacial profiles obtained from the QNM images immediately after hot-pressing (FIG. 2D) and after annealing for 24 hr at 70° ° C. (FIG. 2E) are depicted, showing that the interfaces are at thermodynamic equilibrium. Coarse-grained molecular dynamics simulation snapshots for equilibrated interfaces are shown with (FIG. 2F) $\varepsilon_{AB}$=0.97, (FIG. 2G) $\varepsilon_{AB}$=0.99, and (FIG. 2H) $\varepsilon_{AB}$=0.99. Inset shows chains at the interface with two different polymer backbones (A and B beads, black and pink) and identical dynamic bonds (X beads, blue). The relative energetic attraction between different bead types is noticeable. (FIG. 2I) Fitted interfacial profiles obtained from the equilibrated simulations. (FIG. 2J) Dynamics of the fitted interfacial width during simulation while approaching equilibrium. (FIG. 2K) Schematic of the field theoretic model, showing two polymer backbones (A and B, grey and pink) with a repulsive $\chi_{AB}$ interaction, an identical dynamic bond (X, blue) with attractive $\in_{XX}$ interaction, and a chain length of N. (FIG. 2L) Interfacial profiles predicted by the field theoretic model for different values of $\chi_{AB}$ normalized by chain length: 2/N (orange), 3/N (green), 8/N (teal), 16/N (blue), and 32/N (purple). (FIG. 2M) Sticker volume fraction across the interface for the same $\chi_{AB}$ values, showing that dynamic bonds cluster at the interface with increasing $\chi_{AB}$.

This sigmoidal function (Equation 1 as shown below) is analogous to the analytic solution by Helfand and Tagami for the interface between two immiscible polymers in the strong stretching regime.

i.

$$\phi(z) = \frac{1}{1 + e^{-(z-z_0)/\xi}} \quad \text{(Eqtn. 1)}$$

Figure 4E:
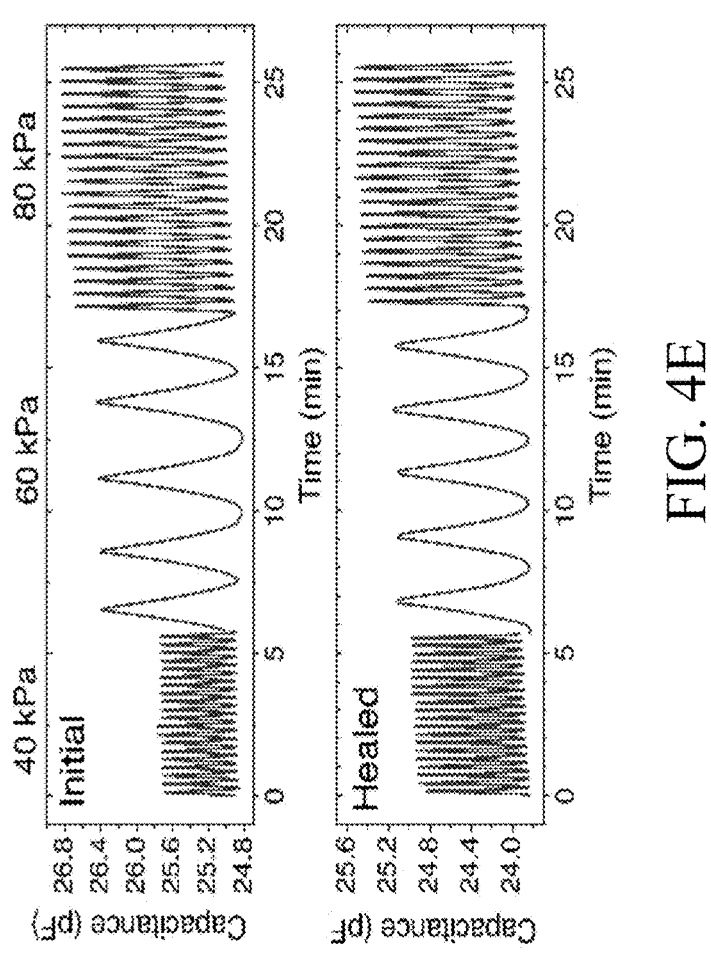
FIGS. 4A-4N represent a demonstration of functional molecular recognition and healing in soft electronic devices based on dynamic polymer composites, with a schematic of a device (or circuit element) in the exemplary form of a pressure sensitive capacitor (FIG. 4A), images (FIGS. 4B, 4C and 4D) showing different stages of the device of FIG. 4A, capacitance-related plots for the device (FIGS. 4E, 4F and 4G), simulated images or related aspects (e.g., via plots in a graph) and attributes of an exemplary device (FIGS. 4H, 4I, 4J, 4K, 4L and 4N) including images of an underwater circuit assembly of a related circuit (e.g., light-emitting diode, "LED")
Figure 4A:
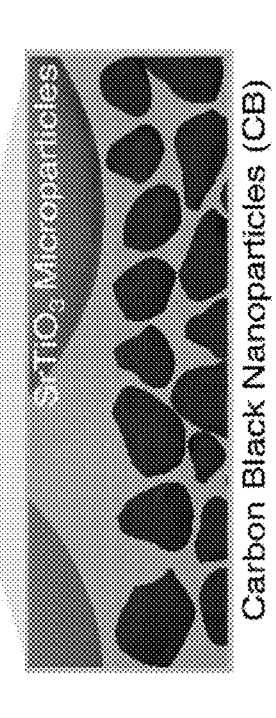
Figures 4B, 4C, 4D:
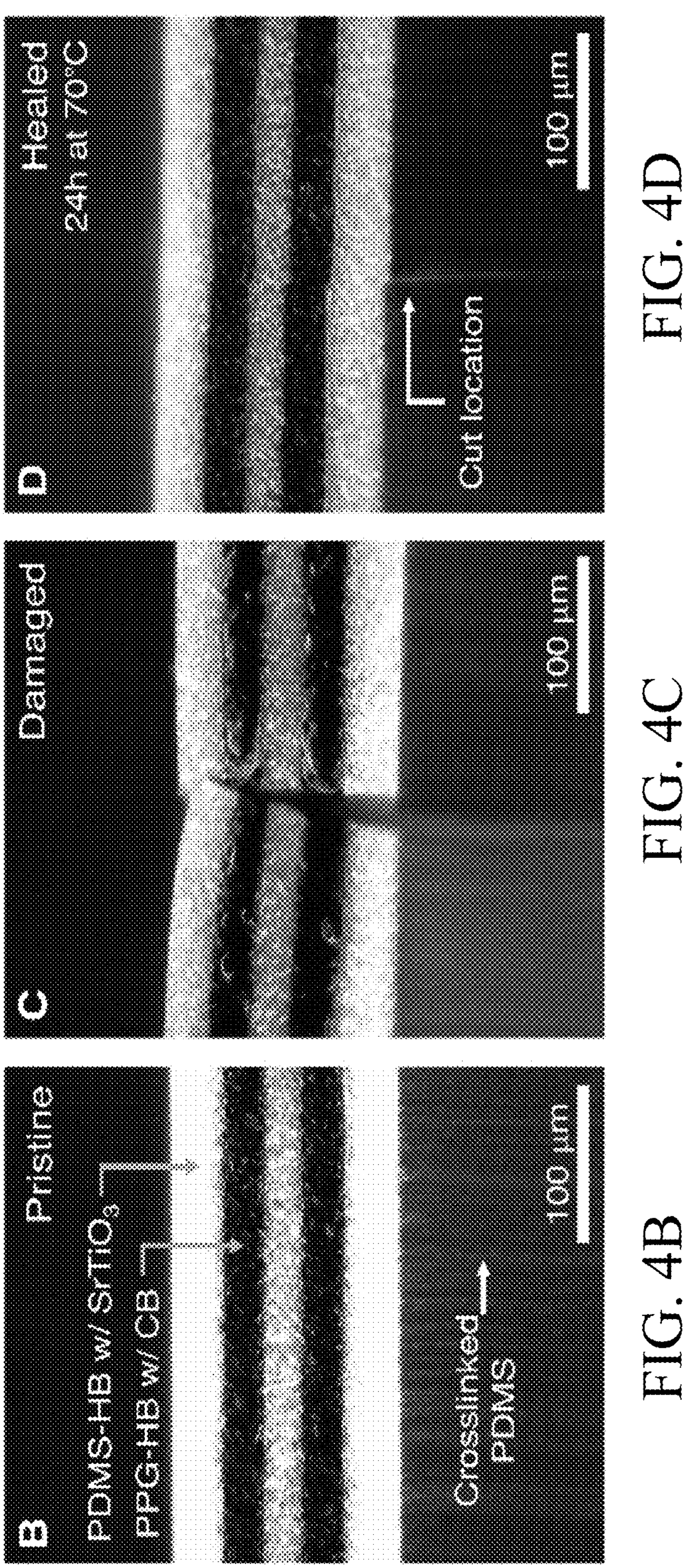

The interfacial width was found to increase with increasing hot-pressing temperature, evidenced by the fitted correlation lengths (ξ) of 13.3±0.7, 22.8±0.7, 39.1±1.4 nm for 50 degrees celsius, 70 degrees celsius, and 100 degrees celsius hot pressed films, respectively (FIG. 4D. However, if subsequently annealed at the same temperature, all films exhibited similar interfacial widths (FIG. 4E) with correlation lengths (ξ) of 22.7±1, 25.6±1.6, and 19.5±1.3 nm for the initially 50 degrees celsius, 70 degrees celsius, and 100 degrees celsius hot pressed films, respectively. These observations suggest that the interfaces are at thermodynamic equilibrium. Importantly, these interfaces are all measured at room temperature, without rapid quenching, which means that the interfacial width (and thus, interlayer adhesion) can be programmed at a specific temperature and then locked in place by cooling the chains into a kinetically trapped state.

The experimentation efforts also estimated the interdiffusion depth of PDMS-HB into bulk PPG-HB by performing XPS on interfaces healed for 30 minutes at 70 degrees celsius and 100 degrees celsius and then mechanically separated at room temperature. The experimentation efforts see a clear decrease in the Si/C ratio with increased sputtering, which allows one to estimate the molar fraction of PDMS-HB as a function of depth from the interface. This yields a correlation length of ~7 nm at 100 degrees celsius and ~2 nm at 70 degrees celsius. The increased correlation length at higher temperature matches the trend observed above in the QNM mapping.

Figures 2D, 2E, 2I, 2J:
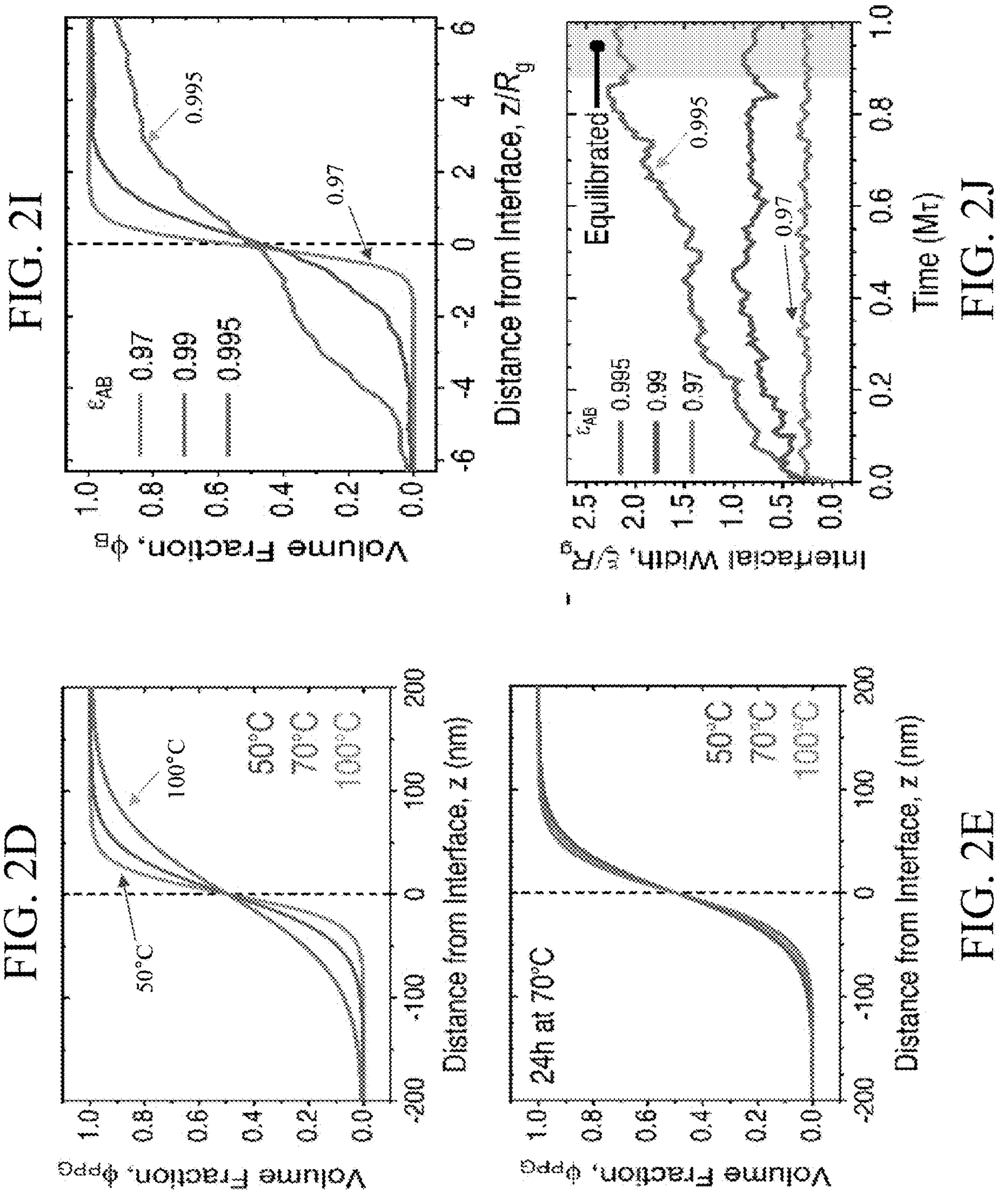
Figures 2F, 2G, 2H:
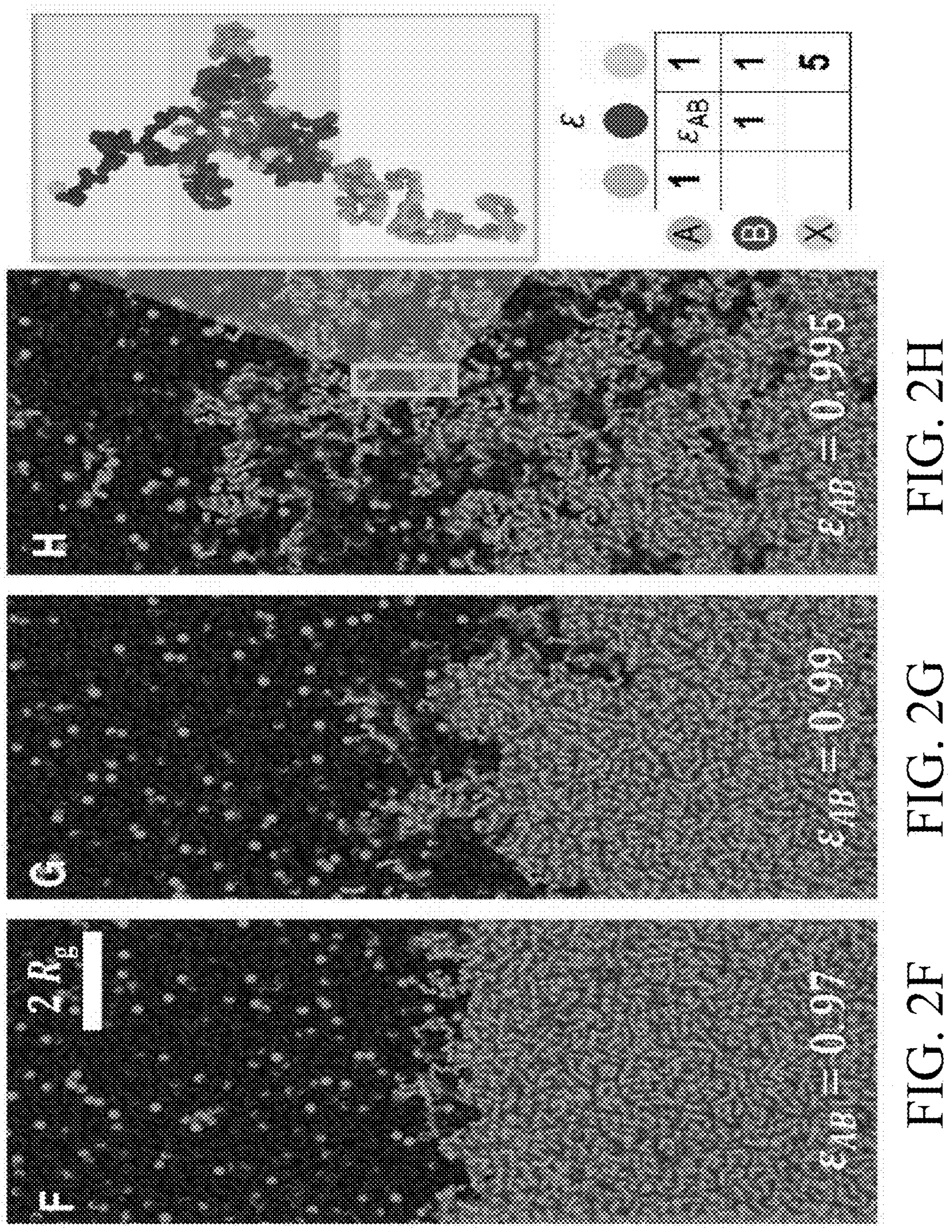
Figures 2K, 2L, 2M:
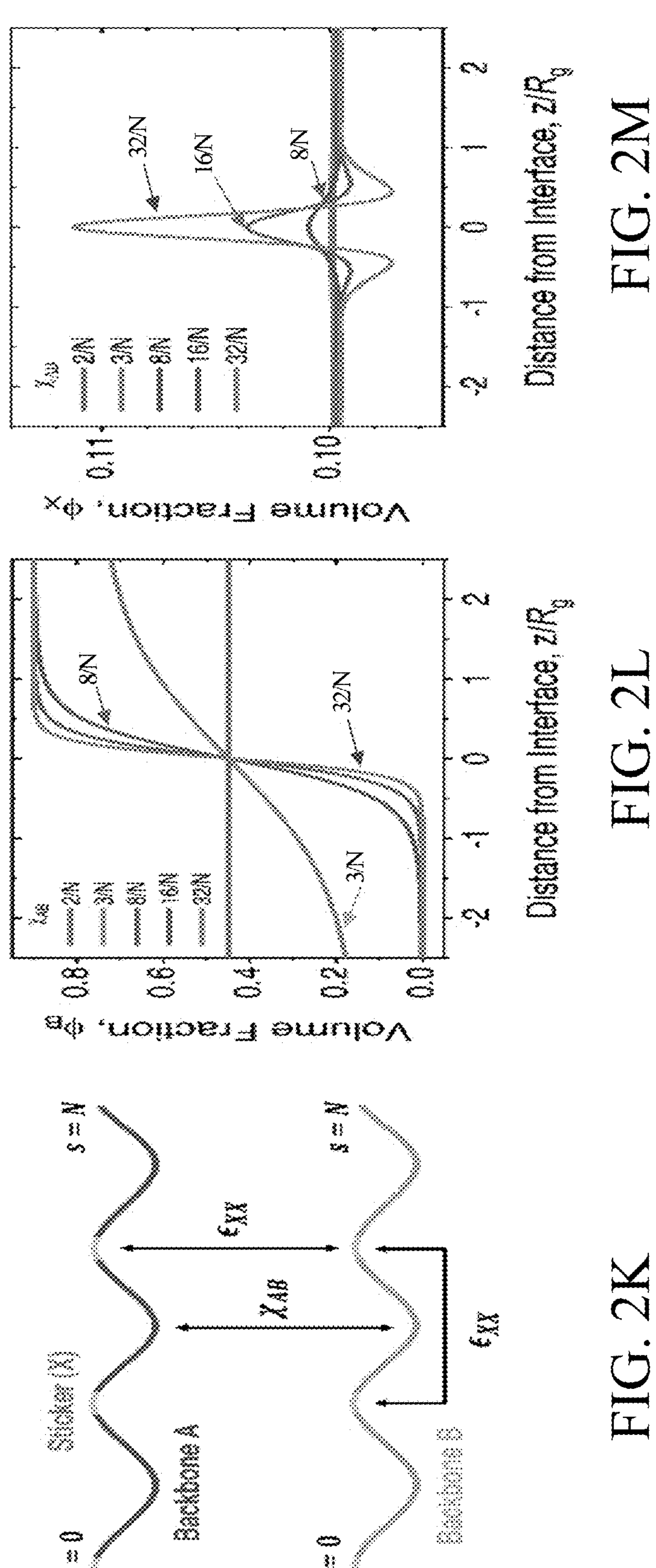

To further understand the process underlying the formation of an adhesive interface between polymers containing similar dynamic bonds but immiscible backbones, the experimentation efforts included conducting coarse-grained molecular dynamic simulations using a simple bead-spring model depicted schematically in the inset of FIG. 2F-2J. To model the dynamic polymer network, the experimentation efforts introduced dynamic bonding beads spaced periodically along the polymer backbone with increased interaction energy $\varepsilon_R$=5 ε, relative to the backbone beads of $\varepsilon_P$=1 ε. Following previous simulations of homopolymers, immiscibility of the backbones was introduced by decreasing the interaction energy between distinct backbone beads from $\varepsilon_{AB}$=1 ε (self-healing) to $\varepsilon_{AB}$=0.95 ε (entirely immiscible). Independently prepared slabs of the two polymer species were brought together in the melted-state and allowed to inter-diffuse over time until the interface reached a thermodynamic equilibrium (FIGS. 2F-2I). Throughout the simulation the interfacial width was tracked as a function of time by fitting Equation 1 to the extracted density profiles (FIG. 2J). Consistent therewith, the experimentation efforts observed that the equilibrium interfacial width increased with increasing strength of interaction between the immiscible polymers.

Finally, to build on the experimental data and simulation results, FIGS. 3A-3G show how some of the experimentation efforts are useful in developing a field theoretic description of the interface between two immiscible polymer backbones (denoted by A or B monomers) with the same dynamic bonding units (denoted by X monomers). The illustrated aspects of FIGS. 3A-3G concern an interfacial-tension mediated alignment and healing between immiscible dynamic polymers in a multi-layered film.

Figure 3C:
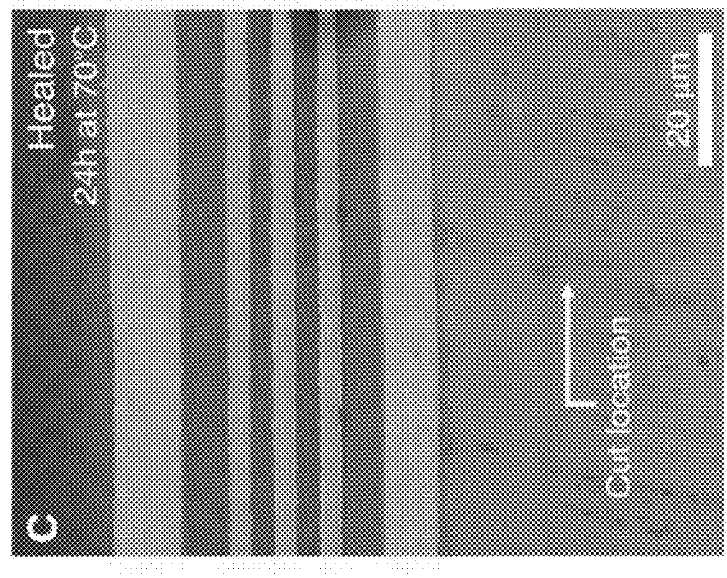
FIGS. 3A-3G show aspects of an interface with interfacial-tension mediated alignment and healing between immiscible dynamic polymers in a multi-layered film, in a specific example experimental embodiment with: cross-sectional optical microscope images of a laminate in different stages (FIGS. 3A, 3B and 3C), simulation snapshots showing how an initially-misaligned and separated laminate aligns and heals over time (FIGS. 3D, 3E and 3F), and a graph showing that misalignment distance decreases steadily with simulation time until alignment is achieved (FIG. 3G)
Figure 3B:
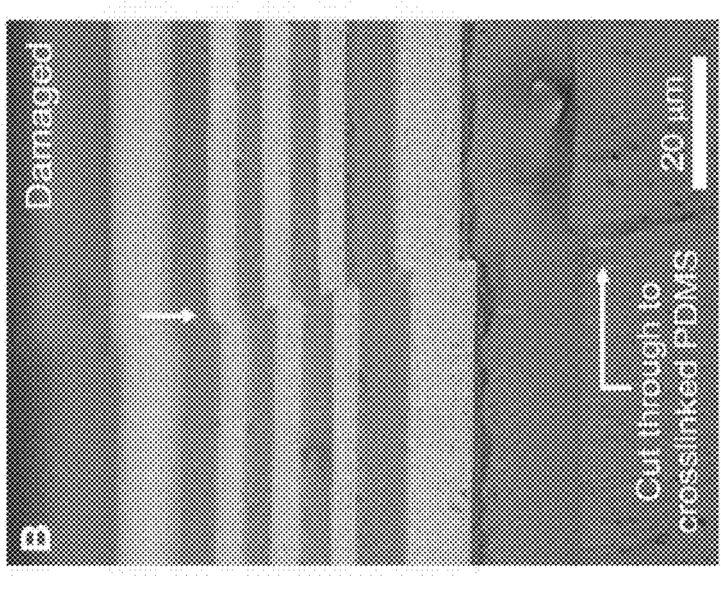
Figure 3A:
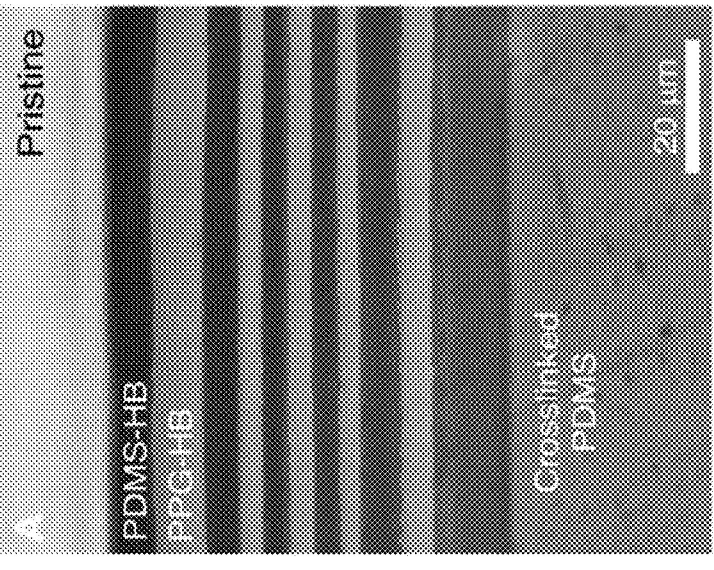
Figures 3D, 3E, 3F, 3G:
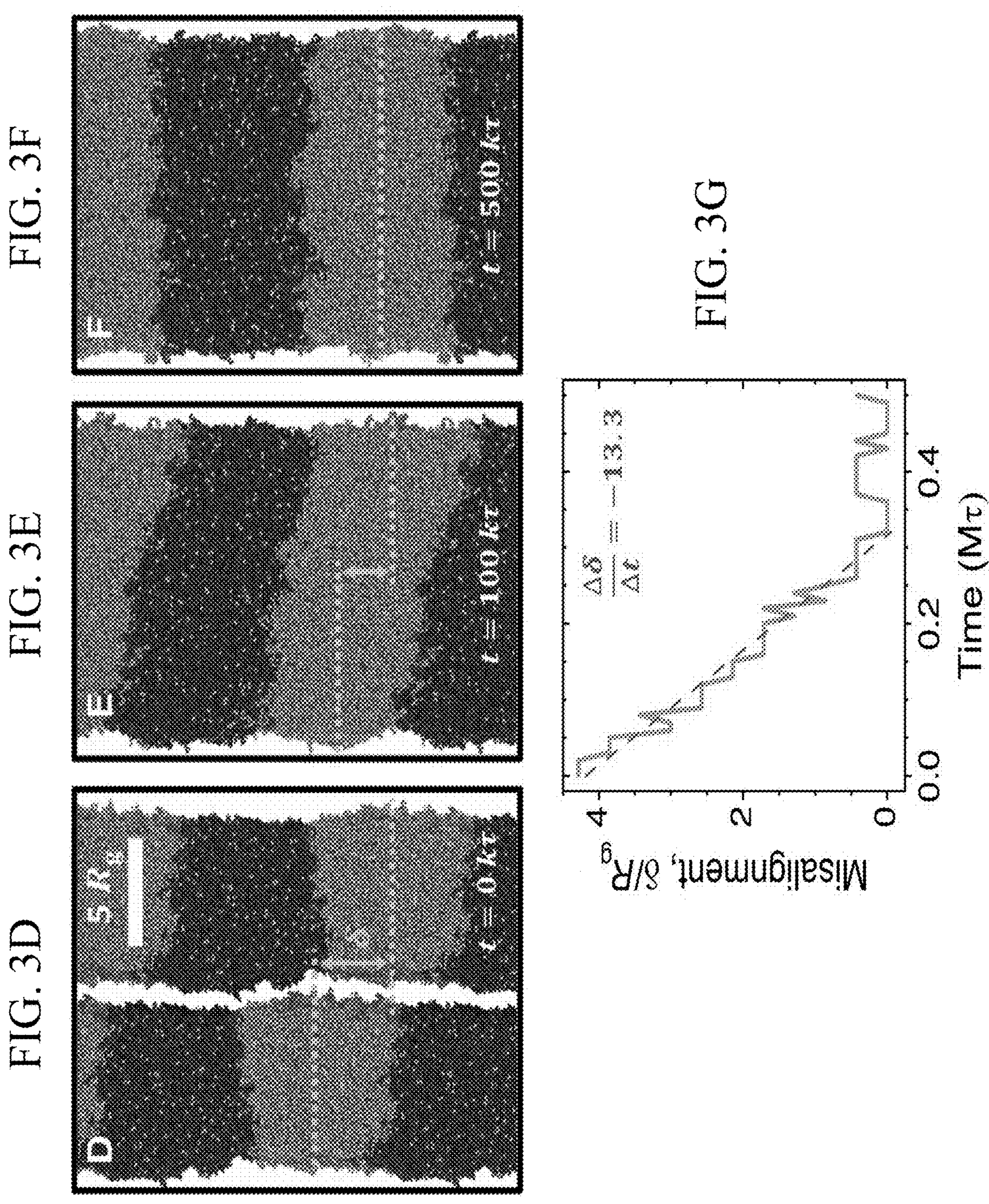

FIGS. 3A-3G are as follows. Cross-sectional optical microscope images of (FIG. 3A) the pristine hot-pressed multilayer laminate, (FIG. 3B) the damaged and misaligned laminate, and (FIG. 3C) the healed and re-aligned laminate following annealing for 24 hours at 70 degrees celsius. The crosslinked PDMS substrate (bottom layer) is unable to heal and marks the damage site. (FIGS. 3D-3F) Simulation snapshots showing how an initially misaligned and separated laminate aligns and heals over time. The plot in FIG. 3G shows that misalignment distance decreases steadily with simulation time until alignment is achieved.

The polymer-network model predicts the monomer density profiles for an incompressible melt of AX and BX block copolymers of the same chain length N, whose interactions are dominated by a pairwise, repulsive chi parameter between A and B monomers ($\chi_{AB}$) and a pairwise, attractive parameter between X monomers ($\in_{XX}$). Sec, e.g., FIGS. 2K-2M and FIGS. 3K-3M). With increasing $\chi_{AB}$, analogous to decreasing temperature in the experiment, from the experimentation efforts it was observed that a decrease in the interfacial width between the polymers occurred (FIG. 3L). In addition, the experimentation efforts also observe an increase in sticker clustering at the AX-BX interface with increasing $\chi_{AB}$ (FIG. 3M), where stickers at the interface reduce the system free energy by minimizing the number of A-B contacts. This is further supported by the fact that the density profiles are almost independent of $\in_{XX}$.

The combination of experiments, simulation, and theory suggest that at high temperatures, where the chains are not kinetically limited, the interface between two immiscible dynamic polymers is governed by a decreasing chi parameter ($\chi_{AB}$) between the polymer backbones at higher temperatures, which increases the interfacial width, along with a clustering of dynamic bonds at the interface to reduce contacts between the immiscible backbones. The experimentally measured interfacial widths (ξ) by QNM are larger than would be expected based on the estimated $R_g$ values for PDMS-HB and PPG-HB of ~6 nm and ~3 nm, respectively assuming homopolymers with similar $M_n$.[21] However, the correlation lengths obtained by XPS are well-within the estimated $R_g$ values. The experimentation efforts attribute the larger interfacial widths measured by QNM to finite tip size broadening but note that the important qualitative trends remain consistent across experiment, simulation, and theory. Moreover, the consistency between experiment, simulation, and theory suggests that these models could be used to screen polymer backbones and dynamic bonding linkers for desirable mechanical and healing properties.

The experimentation efforts next sought to test the healing of multi-layer films of PDMS-HB and PPG-HB. The experimentation efforts support the insight that the reduced interfacial healing between the polymers would enable autonomous re-alignment of the films after damage. Taking advantage of the immiscibility of PDMS-HB and PPG-HB, the experimentation efforts stacked alternating films with a thickness of ~100 μm and hot-pressed them to a final film with a thickness of ~70 μm and 11 alternating layers, with thicknesses between 3-15 μm (FIG. 3A). A small amount of dye was added to PPG-HB films for optical contrast. The resulting film was placed on a crosslinked PDMS substrate and then cut in half. FIG. 3B shows the misalignment between the alternating layers as well as the cut extending into the crosslinked PDMS substrate. After annealing the film at 70 degrees celsius for 24 hours, the layers have autonomously re-aligned to reform sharp and alternating interfaces between the PDMS-HB and PPG-HB (FIG. 3C). Moreover, the misaligned cut in the crosslinked PDMS (which is not able to self-heal) remains clearly visible.

The phenomenon of autonomous re-alignment and healing in multilayer structures was also observed in the example coarse-grained simulation model. During the simulation, the polymer surfaces join together with an initial misalignment (denoted δ) and selectively inter-diffuse (FIG. 3D). The system steadily realigns until reaching a thermodynamic equilibrium that is fully aligned (FIGS. 3E-3G). The correspondence between simulation and experiment suggests that this phenomenon can be generalized to other pairs of polymers and fine-tuned to achieve a balance between interfacial adhesion of layers and selective interfacial healing.

Figures 4F, 4G:
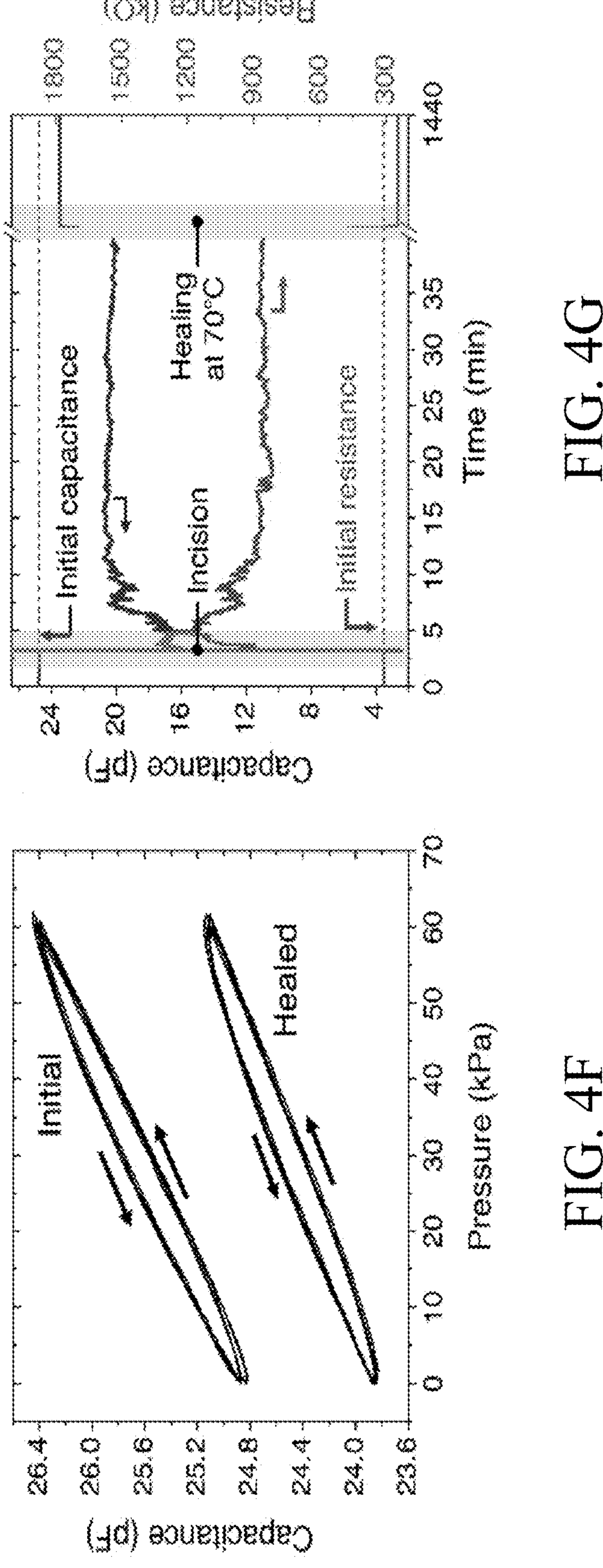
Figure 4L:
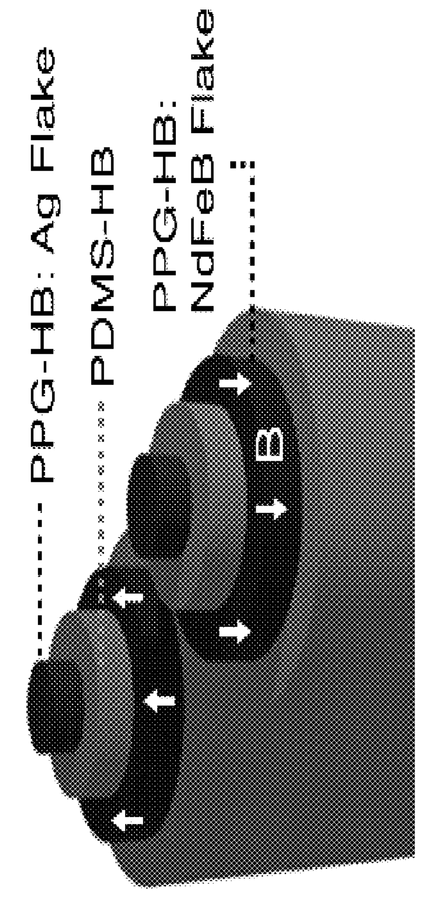
Figure 4H:
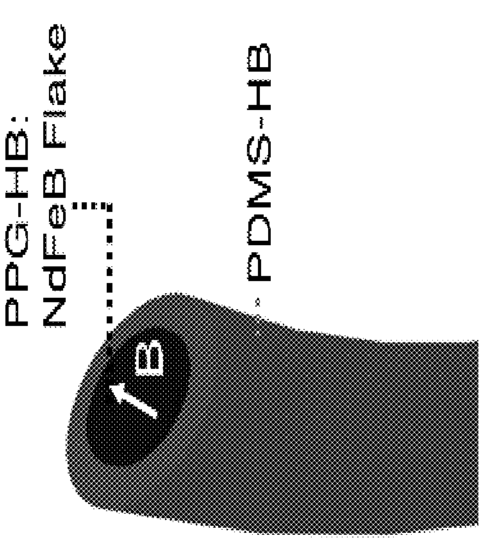
Figure 4K:
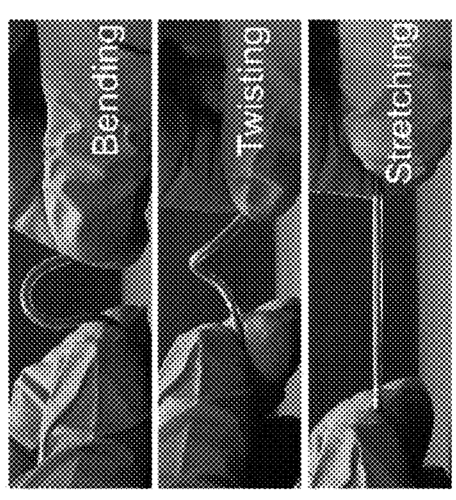
Figure 4K:
Figure 4K:
Figure 4J:
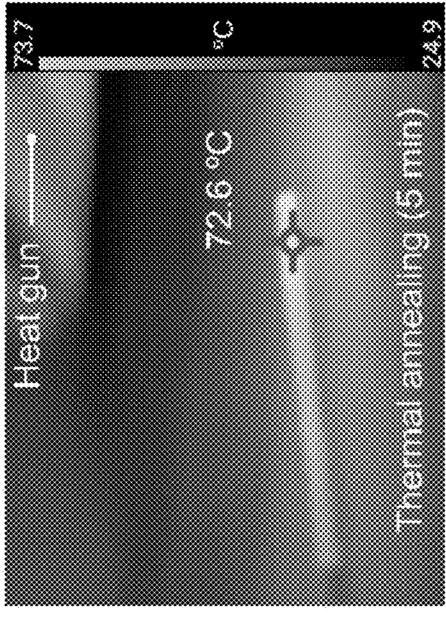
Figure 4J:
Figure 4I:
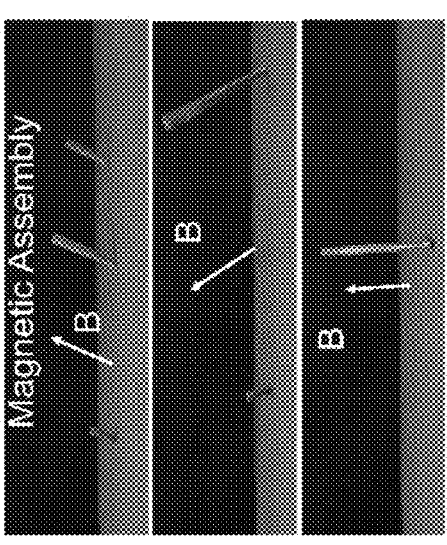
Figure 4N:
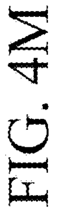
Figure 4N:
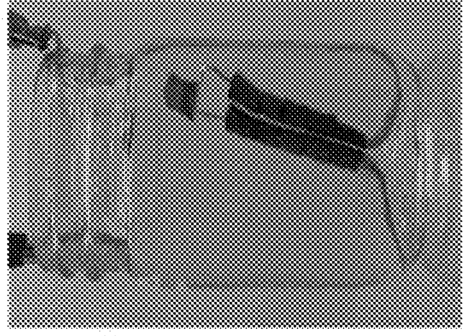
Figure 4N:
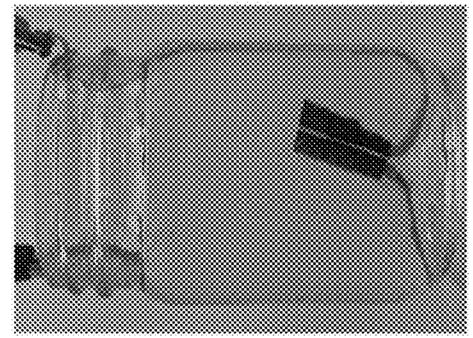
Figure 4N:
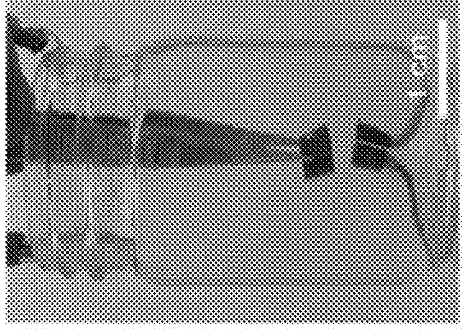
Figure 4N:
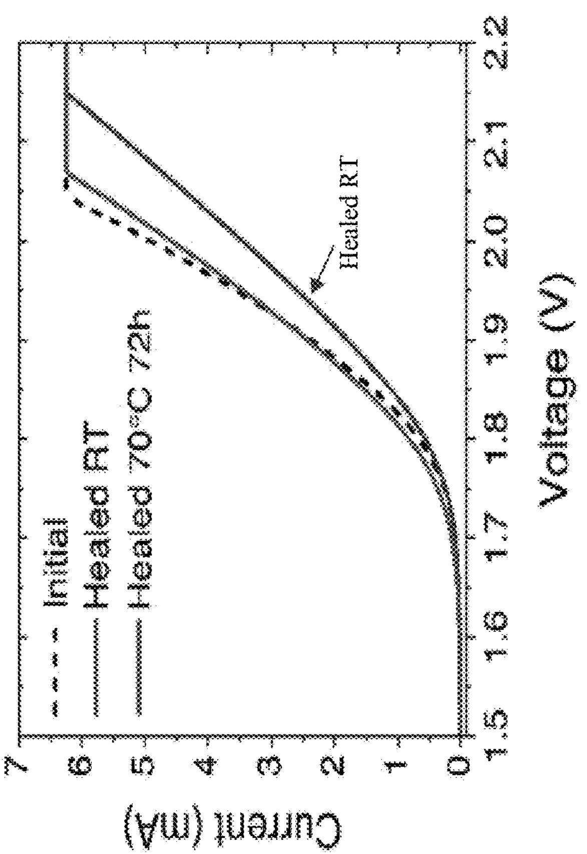

To demonstrate that the use of alternating layers of immiscible dynamic polymers could promote alignment during the healing of a thin (~10-100 μm), multi-layered electronic device, the experimentation efforts considered the functional healing of a pressure-sensitive capacitor. FIGS. 4A-4N represents a demonstration of functional molecular recognition and healing in soft electronic devices based on dynamic polymer composites, with a schematic of a device (or circuit element) in the exemplary form of a pressure sensitive capacitor (FIG. 4A). This experimental work was taken further to show the feasibility of remote magnetic assembly and welding of functional materials and devices, with the functional polymer system (e.g., PPG-HB and PDMS-HB) developed for the pressure sensing capacitor being again used.

More particularly, FIGS. 4A-4N are described as follows. FIG. 4A shows a schematic of a pressure sensitive capacitor with electrodes made from a PPG-HB: Carbon black 4:1 weight ratio composite, and dielectric layers made from a PDMS-HB:$SrTiO_3$ 4:1 weight ratio composite. FIG. 4B shows dark-field optical images of the cross-sections of the initial capacitor, the capacitor after fracture showing layer misalignment (as in FIG. 4C), and the healed device after re-alignment during annealing for 24 hours at 70 degrees celsius with the healed device (e.g., as part of a sensor) having performance recovery to be approximately the same to the pristine device (as in FIG. 4D). FIG. 4E has an initial (top) and healed (bottom) pressure-sensing performance as a time series. Capacitance was monitored while cyclically applying pressures ranging from 0-80 kPa. FIG. 4F shows capacitance versus pressure with plots of the lincar dependence of the capacitance upon pressure with minimal change in drift and hysteresis between the initial (top) and healed (bottom) sensor. FIG. 4G shows series capacitance and resistance as the device is cut and healed at room temperature, and after annealing at 70 degrees celsius. FIG. 4H is a schematic of core-shell magnetic fibers made from a PPG-HB:NdFEB flake 1:4 weight ratio composite and PDMS-HB (with adjacent dark field optical images of the cross-sections of the initial capacitor). FIG. 4I shows a magnetic assembly of the exemplary core-shell fibers. FIG. 4J shows thermal welding of the assembled fiber at 70 degrees celsius for 5 minutes with a heat gun. FIG. 4K shows images of the welded device bending, twisting, and stretching to show mechanical robustness. FIG. 4L shows a schematic of double core-shell fibers with separate electrically conductive (PPG-HB:Ag flake 1:1 weight ratio composite) and magnetic (PPG-HB:NdFEB flake 1:4 weight ratio composite) layers with PDMS-HB shells. FIG. 4M provides images of the underwater circuit assembly of the LED circuit. FIG. 4N shows current-voltage sweeps of the initial device (black, dashed line), after room temperature underwater healing (red, solid lower line), and after annealing at 70 degrees celsius for 24 hours (blue, solid upper line).

As indicated above, such a pressure-sensitive capacitor is shown in FIG. 4A. The capacitor shown in FIG. 4A was made from alternating layers of homogenous composites of PDMS-HB embedded with dielectric $SrTiO_3$ nanoparticles (20 wt %) and PPG-HB embedded with conductive carbon black nanoparticles (20 wt %). The multi-layered film was placed on top of a covalently cross-linked PDMS substrate, and the ends were cut off so that the location of the incision could be visually observed with a microscope. FIGS. 4B-4D show microscope images of a cross-section of the parallel plate capacitor in the pristine, damaged, and healed state. In the example experiments, the performance of the pressure-sensing capacitor was first assessed by cyclically compressing the device with different pressures (e.g., 0-80 kPa) and rates. See, e.g., FIG. 4E. Next, the capacitor was manually cut in half, while monitoring the change in the series capacitance and resistance (FIG. 4F). Only a partial recovery of the capacitance was observed at room temperature and microscope images of the edge of the device showed misaligned layers (FIG. 4C). Following heating at 70° C. for 24 hours, the capacitor recovered 96% of its initial value and exhibited quantitatively similar pressure-sensing performance when subjected to the same cyclic loading conditions (FIGS. 4E-4F).

As an additional demonstration of the potential utility of this pair of selectively weldable dynamic polymers, the experimentation efforts achieved fabricated core-shell fiber structures with composites containing magnetic NdFEB μ-flakes (~10 μm, 80 wt %) embedded within PPG-HB as the core material and PDMS-HB as the shell material (FIG. 4H). After magnetizing these fibers with an impulse magnetizer (1.5 T), their motion could be controlled with an external magnetic field to achieve rigid body rotations. When cut into pieces, these fibers exhibited a magnetic force which helped to guide re-assembly without any manual alignment and induced a contact pressure to promote selective welding of the layers (FIG. 4I, also viewable as a sequence). After thermal welding at 70° C., the magnetically assembled fibers could withstand bending, twisting, and stretching deformations (FIGS. 4J-4K).

Building upon this demonstration, the experimentation efforts achieved fabricated multi-layered magnetic wires with a conductive core, an insulating shell, a magnetized layer, and an outer encapsulating shell (FIG. 4L). Two wires with opposite magnetic orientation were assembled to make a light-emitting diode circuit. Upon cutting the wires into four pieces the circuit could be re-assembled by adding the components into a glass vial filled with water where the magnetic forces guided the assembly of the wire to achieve almost instantaneous electrical healing, which illuminates an LED (FIG. 4M). Importantly, the magnetic forces guided the alignment of the two terminals of the LED in the correct orientation with respect to the voltage source (+3 V) and ground. Full mechanical and electrical healing was achieved upon thermal annealing. Comparison of current-voltage sweeps of the pristine circuit, with the magnetically assembled, healed device (70° C., 72 h) showed comparable performance, as indicated by the turn on voltage for the light emitting diode (FIG. 4N). The case of combining these two polymers with different functional microparticles and adhesively assembling structures capable with selectively weldable layers open new approaches towards fabricating soft electronic and robotic devices with complex functionality.

With the above materials, the experimental efforts demonstrated a multi-layered self-healing device that can autonomously self-heal and re-align without manual intervention after being misaligned during damage. The experimental efforts in connection with the present disclosure achieved this result by using a pair of orthogonal self-healing polymers with identical dynamic bonds but immiscible polymer backbones, and such efforts show that these polymers exhibited significantly reduced interfacial healing dynamics compared to self-healing of the same polymers, allowing for autonomous self-recognition of different functional layers, even in thin film devices with layers below 10 μm. Importantly, however, the use of identical dynamic bonds between the polymers enabled strong interfacial adhesion between the otherwise immiscible layers. With these experimental efforts, the present disclosure describes one or more interfaces between these polymers with a combination of experiment, simulation, and theory and showed that this interface (and thus the interlayer adhesion) was tunable based on annealing conditions. The controlled interlayer diffusion between the polymers also prevented diffusion of embedded particles, which preserved each layer's distinct electronic function and prevented damage-induced mixing.

Figures 5A, 5B:
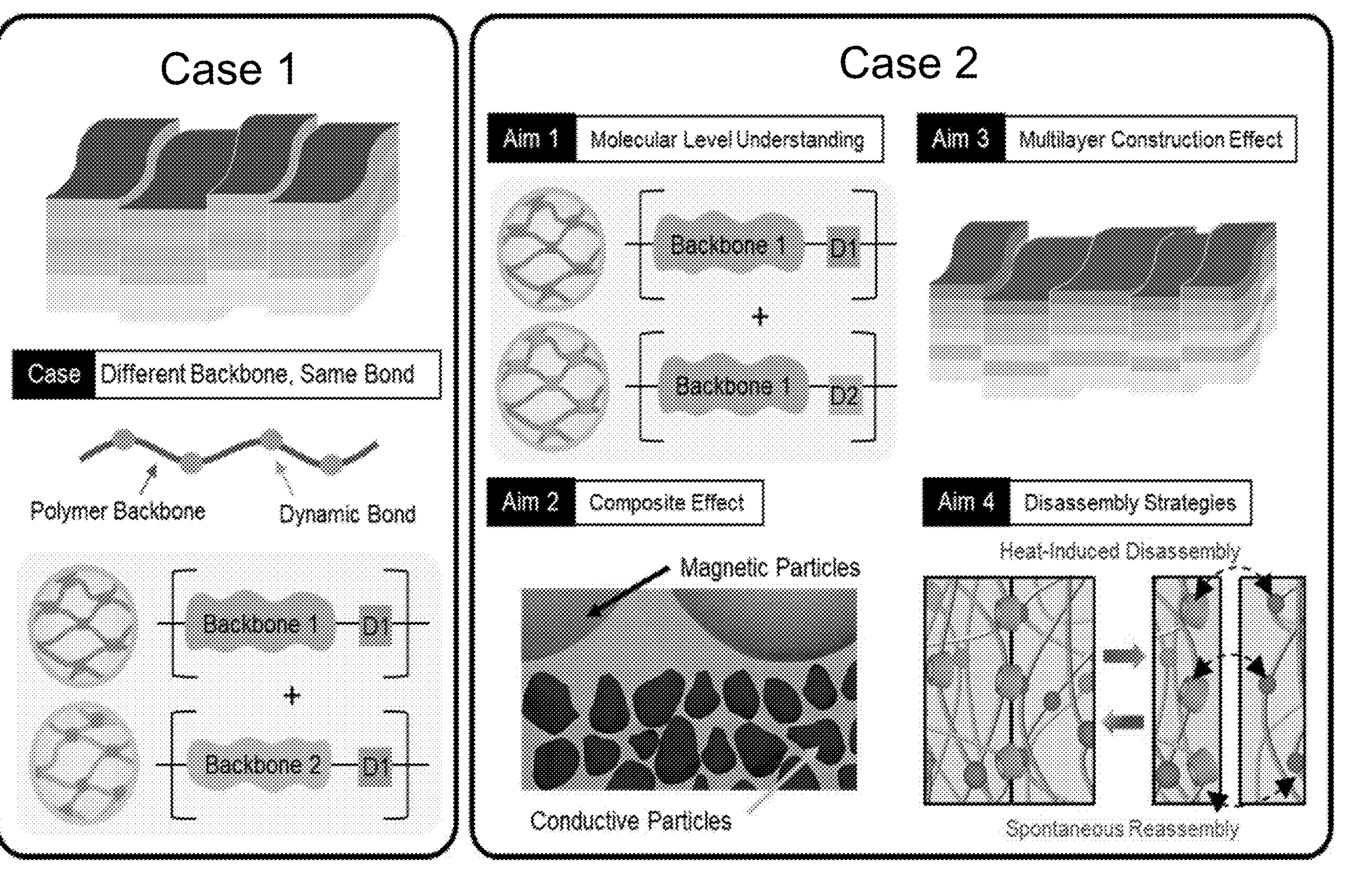
FIGS. 5A-5B respectively correspond to first and second groupings (as Case 1 and Case 2) of experimentation efforts, both in accordance with the present disclosure, in connection with experimental examples of functional molecular recognition and healing based on polymer composites.

FIGS. 5A-5B respectively correspond to two alternative and specific approaches (the first (Case 1) on the left and the second (Case 2) on the right) concerning more detailed aspects of the experimentation efforts, all in accordance with the present disclosure and relating to experimental examples of functional molecular recognition and healing based on polymers and/or polymers composites. These more-specific approaches concern an initial aim (so-called Aim 1) towards quantification of orthogonality of self-recognition and self-alignment rate based on molecular designs.

In connection with the experimental examples discussed in connection with the above figures (e.g., FIG. 1 and FIGS. A-4N), the experimental efforts successfully demonstrated that polymer backbones with a large surface energy difference despite both having identical H-bonding sites allowed self-alignment, orthogonal self-healing and sufficient adhesion between layers. Further experimental work herein addresses how much orthogonality is needed for the polymer backbone structures to achieve self-recognition and self-aligned healing. The above-discussed example type of modular design of polymer structures offers opportunities to further characterize the impact of various molecular building blocks. In order to quantitatively compare the ability for self-recognition and self-alignment from various molecular design strategies, relevant parameters are created in accordance with the present disclosure. In one context also according to the present disclosure, three parameters are used, namely orthogonality ($I_o$), interfacial width (ξ [nm]) and self-alignment rate ($k_s$ [1/s]), to allow quantitative comparisons. By establishing these parameters, there is groundwork for predictive models of related properties.

Orthogonality is created as a parameter to allow ranking the potential of a pair of polymers to self-align. The orthogonality is defined between material X and Y as the inversed ratio of interfacial work ($W_{x-y}$) between Polymer X-Polymer Y vs. average of Polymer X-Polymer X ($W_{x-x}$) and Polymer Y-Polymer Y ($W_{y-y}$) at a given temperature: $I_o=(W_{x-x}+W_{y-y})/W_{x-y}$. An inversed ratio is used because a higher orthogonality would correspond to less miscibility and therefore a lower interfacial work. It has been shown previously that interfacial work can be measured using a method modified from an earlier-reported method. Specifically, discs of two polymers are healed on a parallel plate rheometer with a contact area defined by a polytetrafluroethylene (PTFE) sheet with a hole. After curing, the plates are pulled apart at a constant rate to generate stress-displacement curves, similar to those obtained on an extensometer. This process can be repeated for different temperatures in 10 degrees celsius steps and healing monitored by tracking the recovery in the tensile strength, the max displacement, and the interfacial work (i.e., the area under the stress-displacement curve) as a function of healing temperature. This method provides a well-defined interface area and provides more reproducible quantitative comparison between various materials.

The orthogonality is expected to be closely correlated with interfacial width (ξ) between two types of polymers. An increase in orthogonality, which indicates a decreased miscibility/increase phase separation between the two polymers, corresponds to a smaller interfacial width. The interfacial width ξ can be characterized by atomic force microscopy quantitative nano mechanics (AFM-QNM). This technique is used to directly visualize the intermixing of polymers at the interface by tracking changes in the modulus at the interface between two polymers). whose width is measured quantitatively by fitting to a sigmoidal function:

$$\phi(z) = 1/\left(1 + e^{-\frac{z-z_0}{\xi}}\right),$$

analogous to the analytic solution by Helfand and Tagami for the interface between two immiscible polymers[34]. ϕ(z) is the volume fraction of one polymer as a function of position, $z_0$ is the location of the interface, and ξ is a measure of the interfacial width. Sec Helfand, E. & Tagami, Y. Theory of the interface between immiscible polymers. *Journal of Polymer Science Part B: Polymer Letters* 9, 741-746.

The self-alignment rate ($k_s$) can be determined by measuring the misalignment change for damaged single-layer or multilayered films at different time intervals at a given temperature. The films can be prepared to be of sufficient thickness ($L_{thickness}$, approximately 50 □m or more, so that the cross-sections can be easily visualized using an optical microscope. Optical images can be taken at multiple intervals of 12 to 24 hours, and ImageJ analysis can be employed to quantify the remaining misalignment ($L_{mis}$, distance between the edges of the films). The degree of alignment ($D_A$) is defined as the percent portion of aligned region as: $(L_{thickness}-L_{mis})/L_{thickness}$. The self-alignment rate can be obtained as the slope of $D_A$ vs. time. In addition to the above parameters, each molecular system can be individually characterized to determine the chemical nature of the bonding and relative ratio of bonding using Fourier-transform infrared spectroscopy (FTIR), X-ray photoelectron spectroscopy (XPS) and X-ray absorption near edge structure (NEXAFS). Room temperature tensile tests can be conducted to determine the mechanical behavior of the polymers. The polymer dynamics can be characterized using oscillatory strain rheometric measurements by measuring the storage (G') and loss (G") viscoelastic moduli at different frequencies of oscillating strain. A relaxation time spectrum analysis can be constructed to quantify the full distribution of energy dissipation by converting the experimentally measured storage and loss moduli into a distinct material function of relaxation times. The relaxation time is determined by the molecular design and represents the energy-storing and energy-dissipating properties of a soft material under dynamic mechanical loading.

Figure 6:
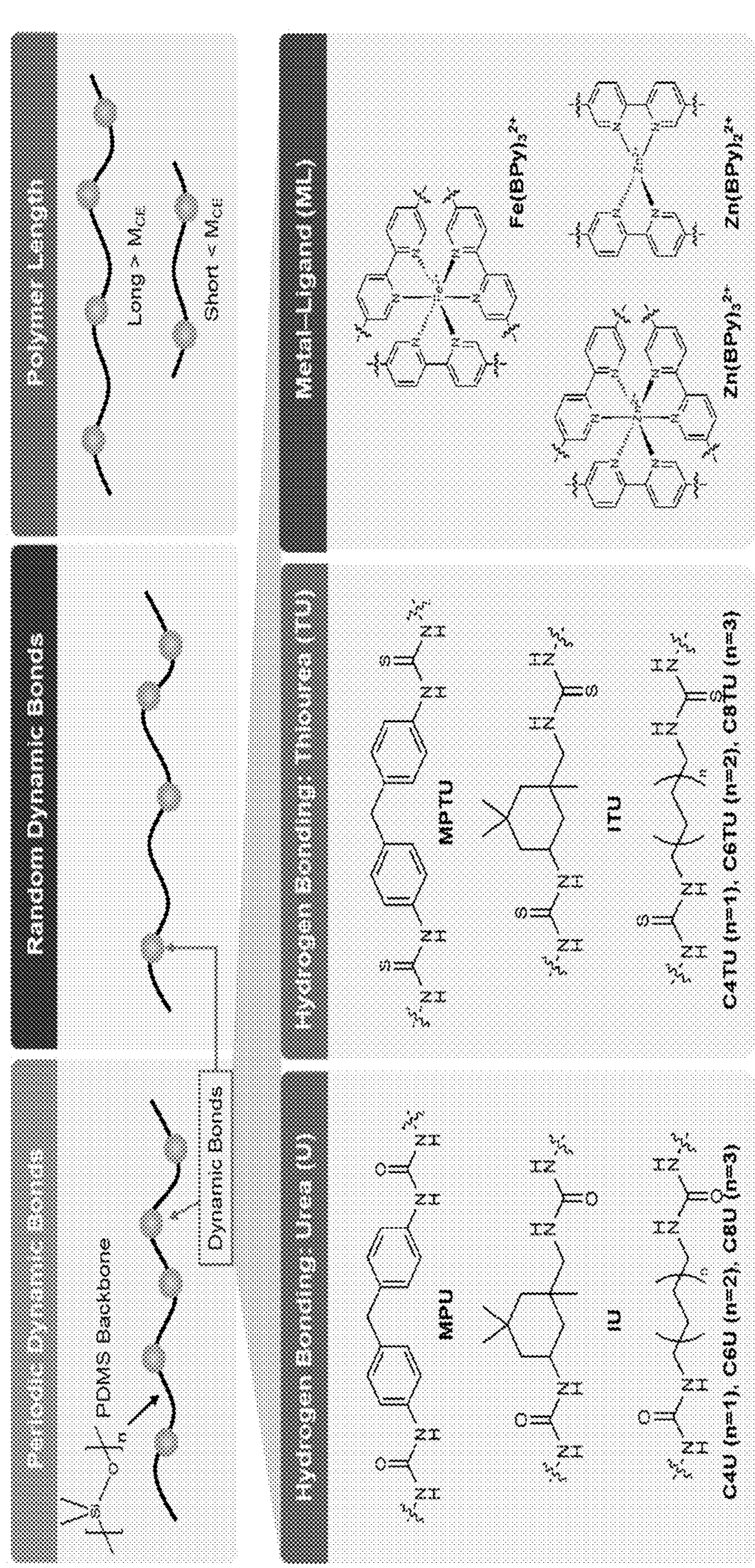
FIG. 6 is a set of schematic representations showing polymer structures and chemical structures, also according to examples of the present disclosure.

Also according to examples of the present disclosure, FIG. 6 is a set of schematic representations showing polymer structures and chemical structures, and useful to describe a polymer design that includes or consists of two main building blocks. More specifically, the top panel of FIG. 6 shows a schematic representation of polymer structures with periodically (left) and randomly (middle) placed dynamic bonds, and polymer structures with different molecular weight. The bottom panel of FIG. 6 shows chemical structures of dynamic bonds that employed in such example design. To test whether the findings of the above consideration (or investigations) can be extended to other polymer backbones, the poly(propylene glycol) (PPG) version of some of the listed structures are considered.

In this design, the polymer backbone and the dynamic bonding sites periodically spaced within the polymer backbone, which is termed herein as periodic dynamic polymers (PDPs). The periodic placement of dynamic bonding sites are chosen because the experimental efforts as shown above indicates that such a regular placement enables maximum probability for dynamic crosslinking, high polymer toughness and well-controlled mechanical properties. First, such experimentation involves performing measurements to collect data on the above three quantitative parameters for a group of polymers with varied polymer backbone surface energies while having similar H-bonding dynamic bonding sites. The above information establishes a baseline for quantitative comparison with other polymers, of which considerations (e.g., assessments, investigations, experimentation, etc.) would confirm suitability as alternatives. Since polymers with different backbone surface energies are immiscible, in connection with this work investigated or assessed are: 1) two polymers with identical backbone chemistry but different dynamic bonding chemistry; and 2) two polymers with the same backbone and same dynamic bonding chemistry but different periodicity or molecular weight.

First addressed is an approach involving two polymers with identical backbones but different dynamic bonding chemistry and/or different types of dynamic bonding interactions (e.g., hydrogen bonding vs. metal-ligand coordination). Consider, as an example, polydimethylsiloxane (PDMS) as the polymer backbone for its flexible, amorphous and nonpolar nature with low glass transition temperature ($T_{g,PDMS}$=−125 degrees celsius). Moreover, PDMS oligomers with various molecular weights and narrow molecular weight distributions are commercially available. Hydrogen bonding (HB) and metal-ligand coordination (ML) motifs are selected due to their orthogonality, tunable bonding strength, and synthetic accessibility. For both HB and ML polymers, the combination of strong and weak bonds is to ensure material robustness and provide comparable mechanical strength and dynamics[8]. The HB units chosen were strong and weak bis-urea bonds formed from 4,4'-methylene bis(phenyl isocyanate) (MPU) and isophorone diisocyanate (IU), respectively. For ML, bipyridine ligand moicties were embedded into the backbone and treated with $FeCl_2$ and $ZnCl_2$ to form strong and weak coordination bonds, respectively. Strong dynamic bonds provide elasticity to the network allowing for material recovery, while the presence of weaker bonds serves as a complementary mechanism that facilitates stress dissipation. For both synthesized polymers, the idea is to target healing dynamics below 120 degrees celsius and solid-like properties at room temperature, which are necessary characteristics for device fabrication and stability. Preliminary results according to the present disclosure reveal higher miscibility (e.g., higher interfacial width) for this pair of polymers with the same backbone and different dynamic bonds when compared to pairs with different backbones and same dynamic bonds. Additionally, based on such experimentation initial findings indicate that dynamic bond-driven phase separation within bilayer systems persists until temperature exceeds 130 degrees celsius.

In accordance with the present disclosure, these surprising discoveries and insights into healing driving force between immiscible polymer networks may be used to provide a foundation of further examples—one of which is an example design that substantially reduces the difference in orthogonality between the dynamic bonds by using H-bonding for the same polymer backbones while slightly changing the H-bonding motifs (with continued use of the bis-urea H-bonding sites known for directional H-bonding).

According to another aspect of the present disclosure, if two such materials (e.g., corresponding to two urea groups) are used and implemented in multi-layer structures as exemplified herein, they are expected to self-align and orthogonally self-heal. This aspect stems from the assumption that a subtle change in the alkyl spacer length between the two urea groups can be sufficient to give the two polymers orthogonality (e.g., PDMS-C4U is not self-healable with PDMS-C6U or PDMS-C8U to recover sufficient mechanical strength). In this context, a related aspect of the present disclosure is that the periodic placement of the dynamic bonding sites may play an important role in maximizing the percentage of bonded sites within the corresponding network to reduce the likelihood for intermixing between the two types of polymers. To test and confirm this aspect, in experimental efforts according to the present disclosure, the random-spaced version is prepared, namely r-PDMS-C6U and r-PDMS-C4U polymers using a mixture of diamines of PDMS with several molecular weights as monomers (FIG. 6). The behaviors and intermixing between r-PDMS-C6U and r-PDMS-C4U are characterized as well as PDMS-C6U and r-PDMS-C6U.

For assessing the effect of molecular weight (MW), another insight of the present disclosure is that the overall MW of the polymer may also impact the degree of intermixing. A previous discovery with these experimental efforts is that when the MW of the polymer is above the critical entanglement MW, the mechanical properties of the PDPs, with directional bis-urca H-bonding sites, exhibited substantial changes that are contradictory to the trend previously known for conventional polymers. Specifically, due to the formation of long-range order from directional H-bonding nanofiber structures below entanglement MW of the polymer, the resulting polymer exhibited higher modulus than the high MW version, which could not form long-range order of H-bonding due to chain entanglement. Therefore, the experimentation characterizes the orthogonality, interfacial width and self-alignment rate of PDMS-C6U-Short and PDMS-C4U-Short vs PDMS-C6U-Long and PDMS-C4U-Long vs. PDMS-C6U-Short and PDMS-C4U-Long vs. PDMS-C6U-Long and PDMS-C4U-Short (FIG. 6).

For assessing the effect of H-bonding site directionality, unlike urea H-bonds, thiourca (TU) H-bonds are known to have a lack of directionality due to its cis-trans isomerization. According to the present disclosure, yet another insight is that self-recognition may not be possible between PDMS-C6TU and PDMS-C4TU, but may be possible (or more than likely) between PDMS-C6U and PDMS-C6TU, PDMS-C6U and randomly spaced r-PDMS-C6TU, or PDMS-C6U and PDMS-C4TU because PDMS-C6U form a stable and ordered network within itself.

As another aim (so-called Aim 2 as in FIG. 5B) in connection with such an analysis, the present disclosure concerns quantitative characterization and understanding orthogonal self-recognition and self-alignment in composite materials. Since neat polymers are used as the matrix materials while nanomaterials provide additional functional properties, such as electrical conductivity or magnetic properties, it is important to consider how the incorporation of nanomaterials impact the three quantitative parameters related to self-recognition and self-alignment. The electrical conduction and magnetic functions are applicable for implementations that accelerate self-repair through heating or electrical field-assisted transport. Indeed, with the experimentation of the present disclosure is has been discovered that the dynamics of the polymer matrix can be leveraged to transport rigid conducting polymers, silver nanowires and carbon nanotubes to re-gain conductive pathways as well as mechanical properties. Further assessment addresses: how use of similar nanomaterials in different layers may impact self-recognition and self-alignment, whether different types of nanomaterials inter-mix with each other over time from adjacent layers, whether such inter-mixing is dictated by the intermixing of the two types of polymers or by the interactions between the dynamic bonding, and how the addition of nanomaterials can impact the intermixing of polymers at the interface and orthogonality.

For assessing these issues, several nanomaterials are considered or investigated in conjunction with selective polymers characterized above in connection with the aim directed towards quantification of orthogonality of self-recognition and self-alignment rate based on molecular design concepts in "Aim 1": Ag flakes (e.g., about 10 micron, as they are known to produce stretchable electrodes with high conductivity), carbon flower particles (as they can be used as conductive filler for pressure sensors, they also have relatively uniform size of typically from 500 nm to 800 nm), NdFeB particles (about 10 micron) (for magnetic field manipulation), and $Fe_3O_4$ particles (about 100 nm, as they can be used to inductively heat polymer).

In terms of polymers, depending on the interactions between the nanomaterial, polymer backbone and dynamic bonding type, through these experimental efforts it is expected that nanomaterial incorporation impacts the mechanical properties and polymer dynamics. If the polymer backbone has interactions with the nanomaterials, the polymer network modulus is expected to increase and dynamics to slow down. On the other hand, if the added nanomaterials have interactions with dynamic bonding sites, they may perturb dynamic bonding with each other, but potentially promote multi-valent coordination between the dynamic bonding sites and nanomaterials. Therefore, this experimental work assesses several situations assuming all the nanomaterials to be used have a polar surface. In each case, the three quantitative parameters are described in connection with Aim 1 and determine if the addition of nanomaterials significantly impact them. Furthermore, locations of the particles in the polymer matrix are identified using transmission electron microscope (TEM), AFM and SAXS. PDMS is chosen as the less-interacting polymer backbone while the more polar poly(propylene glycol) (PPG) is selected as the more interacting one. Both HB and ML interactions are expected to interact with the nanoparticles. The HB1 and HB2 are selected from studies in Aim 1 that gave sufficient orthogonality. Basically, such experimentation performs systematic characterizations of the following pairs of polymers with various four types of nanomaterials: Pair 1: PDMS-HB with PPG-HB; Pair 2: PDMS-HB with PDMS-ML; Pair 3: PDMS-HB1 with PDMS-HB2; and Pair 4: PPG-HB1 with PPG-HB2.

Yet a further assessment (in connection with so-called aim, Aim 3 as in FIG. 5B) concerns an understanding of multi-layer design for self-recognition and self-alignment. In this regard, the self-recognition and self-healing in practical applications is conducted with multi-layer structures. Therefore, according to the present disclosure, consideration is given to how the sequence of multi-layer structure can impact self-recognition and self-healing. In addition, these experimental efforts recently discovered that the supramolecular nanostructure-based shape memory self-healing material, as used in certain of these experiments, can assist with the rapid closing of the damaged gap instead of depending on diffusion and dynamic transport of the polymer (see, e.g., FIGS. 7A-7B). This may serve as an additional mechanism to assist self-alignment in multi-layer systems.

The disclosure now turns to addressing: how the sequence of multi-layer design may impact self-recognition and self-healing, what types of molecular recognition chemistry, polymer design and multi-layer design work the best together and offers the fastest recovery rate, whether a layer of shape-memory polymer can be inserted for utilizing the recently discovered supramolecular nanostructure formation mechanism to realize faster self-alignment and self-healing, and how the above issues are impacted when nanomaterials are incorporated.

These issues are addressed by preparing multi-layer structures with systematically tuned orthogonality and layer thickness. Several scenarios are considered as discussed below. First, all layers are completely misaligned and none of the layers is in partial contact with its counterpart: the experimental efforts in connection with the present disclosure suggest that this scenario is possible to self-align and self-repair from experimental observations relating to the present disclosure. To avoid this situation, a shape-memory polymer is incorporated in the multi-layer stack to help with self-closing of larger wounds (as in FIGS. 7A-7B). A further insight according to the present disclosure, is that if the multi-layer stack has one thick layer incorporated, it will have a higher chance to have at least partial contact with its counterpart to assist with self-alignment. This insight may be tested as in scenario #3 below.

A second scenario relates to whether each layer has a partial contact with its corresponding layer despite partial misalignment, for which it is assumed that they will be able to recover their original multi-layer structure after given sufficient time (and potentially heating) to self-align and self-heal. However, the self-alignment rate will likely be dependent on the degree of orthogonality. Consistent with a further aspect related to this second scenario and also according to the present disclosure, it is assumed that a higher orthogonality drives a faster self-alignment rate assuming similar polymer dynamics. The dependence of self-alignment rate on orthogonality and layer sequence may be consideration by using model systems which enable self-alignment of a tri-layer structure (L1-L2-L1) to be compared to a bi-layer structure (L1-L2), where 3 levels of orthogonality between L1 and L2 can be assessed together with 3 thickness ratios of L1:L2 (1:4, 1:1, 4:1). The self-alignment rate of L1-L2-L1 structure may also be compared to another type of tri-layer (L1-L2-L3), where the orthogonality of L2-L3 is greater or less than L1-L2.

A third scenario is when the layer thicknesses are not uniform, in which case some layers may be completely mis-aligned (i.e. completely in contact with another material and no contact with its own counterpart) while some layers are in partial contact with their counterparts. The dependence of self-alignment rate on orthogonality and layer sequence is considered using the model systems (as in connection with FIGS. 7A-7B). The self-alignment rate of bi-layer structures (L1-L2) is characterized, where 3 levels of orthogonality between L1 and L2, three levels of mis-alignment (d1) or three levels of mis-alignment (d2) are considered together with 3 thickness ratios of L1:L2 (1:6, 1:4, 1:2). In the case when the orthogonality is low, one issue is whether sandwiching a thin layer in between two layers in partial contact provides sufficient driving force for self-alignment, such as L1-L2-L1, in which L2 is completely mis-aligned by three levels (d3) initially to be in contact only with L1 while L1 is in partial contact with each other. Again, three levels of orthogonality between L1 and L2 together with 3 thickness ratios of L1:L2 (1:6, 1:4, 1:2) are assessed.

The above aspects provide a detailed correlation between multi-layer structure design and corresponding self-alignment rate depending on the degree of orthogonality and degree of misalignment expected. The experimentally measured values may be compared to the slab theory approximations where self-alignment rate is calculated based on one dimensional theory that considers the interfacial free energy between two slabs composed of immiscible polymers. To obtain self-alignment rate ($k_s$), selectivity and mobility are taken into account by using the mean square radius of gyration, the interfacial width, and the characteristic relaxation time between the polymer pair.

According to aspects of the present disclosure, such experimentation efforts (e.g., in connection with FIG. 1A through FIG. 4N), in part demonstrate autonomous alignment during the self-healing of multi-layered soft electronic devices, with this alignment being achieved in certain specific examples using two immiscible polymers (e.g., in certain more specific aspects whose different backbones enable interfacial tension mediated re-alignment after damage). In connection with some of the experimentation efforts, the same dynamic bond is used in polymers of adjacent layers of the laminate to maintain strong interlayer adhesion required for a cohesive device. In addition, certain of the experimentation efforts show that the interfacial width between the polymers, which subsequently determines the interlayer adhesion, can be readily programmed by annealing temperature. Further, the exemplary simulation and related theory results suggest that these aspects according to the present disclosure can be readily extended to other molecular systems other than specifically disclosed herein, and that the utility of a materials platform (as exemplified by way of the present disclosure) is useful and beneficial in, among other specific implementations and uses, a wide variety of soft electronics and robotics applications (e.g., by designing thin film, healable pressure sensors, magnetically-assembled and welded structures, and/or self-healable, underwater circuits).

Another important insight of the present disclosure is that dis-assembly between a pair of polymers can ensue from weakened interfacial adhesive energy caused by de-mixing of polymer interfaces. The dynamic non-covalent interactions, as disclosed herein and utilized in the self-healing polymers ("SHPs") favor more dissociation at elevated temperatures. On the other hand, the intermixing between two dissimilar polymers in theory increases with temperature, but the increase of intermixing depends on the time the samples are held at a given temperature and dynamics of the polymers. In connection with yet further experimentation and as part of the present disclosure, it has been discovered that if the dynamic polymer interfaces are quenched to room temperature from the melt-state at high temperature at a fast rate they become kinetically trapped in a molecularly mixed, adhesive state—essential for bonding layers and providing stability against delamination in stretchable devices (this rate can be realized by increasing the rate to a point that is sufficient to realize this effect). A further insight is that if the interfaces are subsequently annealed at intermediate temperatures that permit dissociation of dynamic bonds and slow cooled to room temperature, the polymer chains segregate at the molecular scale before the dynamic bonds can form at the interface, thereby allowing for the facile adhesive separation of the bonded materials by peeling, and subsequent reconfiguring or recycling of composite materials. Therefore, with the library of materials to be investigated in connection with self-recognition and orthogonal healing (Aim 1 hereinabove), such experimentation with additional characterizations is performed on the adhesive energy change between various pairs of materials at different temperatures and heating rate. This provides information on potential energy needed and corresponding temperature and/or heating rate to completely adhesively separate a pair of SHPs. Hence, in accordance with these insights of the present disclosure, SHP pairs with dis-similar polymer backbones or same polymer backbones and dissimilar dynamic bonding chemistry require the least amount of energy for dis-assembling. However, their interfacial adhesive energy at room temperature may also be too weak to maintain the mechanical robustness. Therefore, according to another aspect of the present disclosure, optimal (e.g., tuned) orthogonality between the two materials is used to provide both sufficient interfacial adhesive energy while still providing the ability for being dis-assembled with a stress level realizable by practical methods (e.g., torsion induced by an applied magnetic field if aligned magnetic particles are incorporated into the polymer, or contraction from a two-way shape memory polymer).

Leveraging from this insight, another more-specific example embodiment of the present disclosure involves damage-sensing electronic skin (including but not limited to surgical (e.g., simulation-based training) applications where damage may result from incisions, needles, etc.), which may be constructed using the same or similar types and combinations of materials described hereinabove. Such (optimal) orthogonality between the two materials is provided in certain examples herein such that there is sufficient interfacial adhesive energy while still providing the ability for being dis-assembled. Consistent therewith, further examples are directed to configurations of SHP pairs being fabricated into one or more a multi-layer (e.g., adhesive) patches which may be used for tissue or skin, with attributes of both sufficient interfacial adhesive energy and providing the ability for being dis-assembled (e.g., incised surgically), to be followed by self-healing with automatic realignment.

Figure 8A:
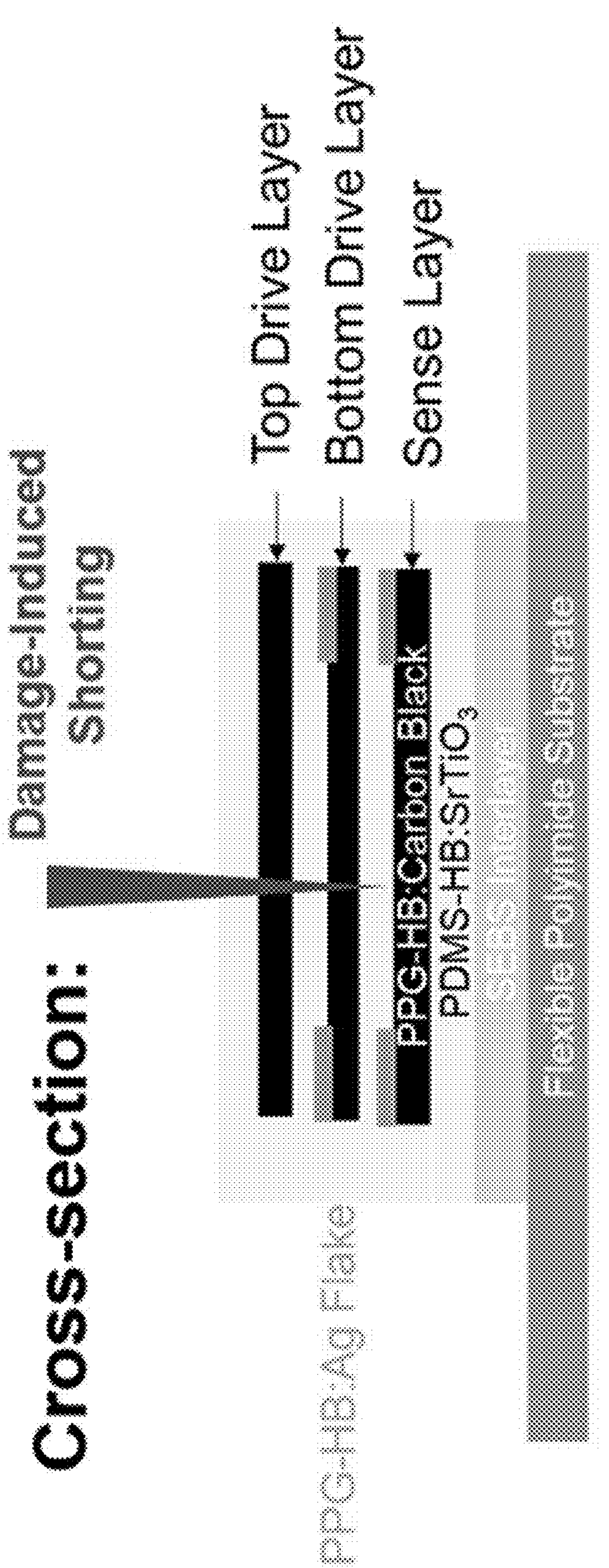
FIGS. 8A and 8B illustrate an exemplary voltage-based x, y-position damage sensor, in which a cross section is shown in FIG. 8A and a schematic is shown in FIG. 8B.
Figure 8B:
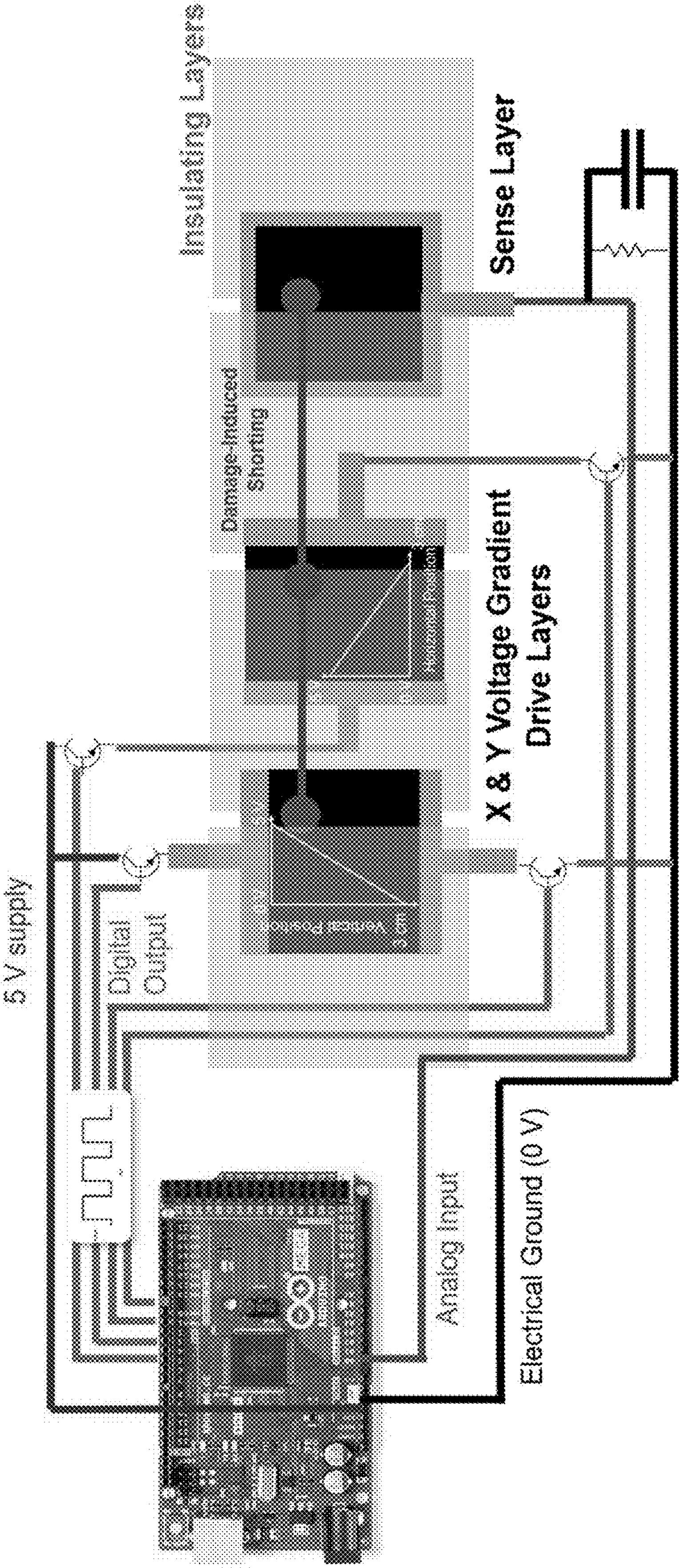

FIG. 8A show an example of such a multi-layer patch as a portion of damage-sensing electronic skin. In this example, the patch includes an exemplary set of layers shown as a cross-sectional view in the lower left. In this example and in order, these layers are (from bottom to top): flexible polyimide substrate (bottom layer), a SEBS interlayer, self-healing insulator (e.g., PDMS-HB: $SrTiO_3$ (4:1 by mass)), self-healing resistor as the sense layer ((e.g., PPG-HB: Carbon Black (4:1 by mass) surrounded by a conductive frame of (PPG-HB:Ag Flake (1:1 by mass)), and respective bottom and top drive layers with self-healing conductors or conductor contacts (PPG-HB:Ag Flake (1:1 by mass)) connected by a self-healing resistor film (e.g., PPG-HB:Carbon Black (4:1 by mass) such that when a voltage is applied, there is a linear drop in the voltage across the resistive films. In response to damage (e.g., a puncture or incision with a conductive implement such as a scalpel or needle), an electrical connection is formed between the sense layer and the top and bottom drive layers, as shown in FIG. 8B. The corresponding voltage signal read out by the sense layer, in certain implementations, corresponds to the 2D position of the damage. The circuit board to the left of FIG. 8B is used to generate such signals and convey an output signal (e.g., digital signal to a remotely-coupled CPU-based device, optical and/or audio signal, etc.). Voltage-based position is also shown as an example where optional position sensing is required or beneficial (e.g., including drive layers such as x,y-position for at least two-dimensional (2D) damage sensing realized by the x and y locations being signaled by the top drive layer in combination with the sense layer, and the bottom drive layer in combination with the sense layer). In alternative example embodiments in which the drive layers may be modified accordingly, damage sensing need not be 2D, 1D, or position sensitive at all. As one of many implementations or applications, such a device (or laminate) may have the immiscible polymer layers as part of a multi-layer patch/cover configured with attributes of having sufficient interfacial adhesive energy and of having an ability for being dis-assembled, and in response to being dis-assembled, self-heal (e.g., configured as a portion of electronic skin or a cover for human skin or tissue).

Such damage can create an electrical connection between the drive layers and the sense layer such that the voltage can be measured and 2D position of the damage can be inferred. The change in resistivity of the drive layers is not used in sensing, but a full self-healing of their electrical conductivity of the drive layers is required to use the sensing device for multiple cycles, which is where the autonomous alignment and self-healing capability is important. In other example embodiments, one or more additional sense layers are included adjacent the illustrated sense layer to gain 3D and/or temporal information about the damage.

Advantageously, such self-healing polymer-based devices/patches may be used for a variety of applications in and outside of the medical fields. Such applications, as examples, could be implemented to: enable models (represented by the laminate(s)) to be reused; provide feedback signals via the circuit board's output signals providing feedback (e.g., for training) from such circuitry integrated with the sensing layer(s); provide a complementary approach to virtual and augmented reality technology; and a variety of applications involving robotics with damage-sensing, self-repairing e-skins.

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other such devices and examples as described hereinabove may also be found in the Appendix of the above-referenced Provisional Application.

The skilled artisan would also recognize various terminology as used in the present disclosure by way of their plain meaning. As examples, the Specification may describe and/or illustrates aspects useful for implementing the examples by way of various materials (e.g., semiconductor) and/or circuits which may be illustrated as or using terms such as layers, blocks, modules, device, component, system, and/or other material-type and circuit-type depictions. Also, in connection with such descriptions, the term "source" may refer to source and/or drain interchangeably in the case of a transistor structure. Such insulative, semiconductor and/or semiconductive materials (including portions of semiconductor structure) and circuit elements and/or related circuitry may be used together with other elements to exemplify how certain examples may be carried out in the form or structures, steps, functions, operations, activities, etc. It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Further relative terms used herein such as approximately, about, "~", substantially, etc. refer to ranges of plus or minus 10% (unless otherwise indicated), and other terms such as "same" and "identical" are to be understood as relating to two compared aspects for which there are no differences, and also in some instances which would be apparent given the context of the discussion, differences are not observable for the context at issue and/or for which there is no discernible difference in light of such context.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. An apparatus comprising:

a plurality of immiscible polymer layers including immiscible polymer layers being characterized by having respectively different immiscible backbones; and a first layer and a second layer, each from among the plurality of immiscible polymer layers, the first layer and the second layer integrated with one another to form a self-healing laminate characterized in that polymer material in the first layer and polymer material in the second layer are cooperatively capable of autonomously recovering from at least one of the first layer and second layer being misaligned by the respectively different immiscible backbones providing interfacial tension-mediated realignment in response to certain of the immiscible polymer layers becoming misaligned.

2. The apparatus of claim 1, wherein certain of the immiscible polymer layers, integrated with or forming at least part of the first layer and the second layer, are characterized by having a common bond that enhances interlayer adhesion.

3. The apparatus of claim 1, wherein the plurality of immiscible polymer layers includes at least one additional immiscible polymer layer, integrated adjacent one of the first layer and the second layer, as part of the self-healing laminate.

4. The apparatus of claim 1, wherein certain of the immiscible polymer layers, integrated with or forming at least part of the first layer and the second layer, are characterized by having respectively different immiscible backbones.

5. The apparatus of claim 1, wherein the first layer and the second layer are immediately-adjacent layers characterized by polymers having said respectively different immiscible backbones, and the self-healing laminate is configured as a portion of electronic skin or as a cover for human skin or tissue.

6. The apparatus of claim 1, wherein certain of the immiscible polymer layers include or correspond to the first layer and the second layer.

7. The apparatus of claim 1, wherein each of the certain of the immiscible polymer layers, including the first layer and the second layer, are formed from polymer blends that manifest autonomous recovery, in response to at least one of: being damaged, and being misaligned.

8. The apparatus of claim 1, wherein the first layer and the second layer are immediately-adjacent layers among the plurality of immiscible polymer layers, wherein the first layer and the second layer, collectively, manifest structural integrity in a first non-damaged state, and in response to being damaged, manifest a recovery state followed by a recovered state, wherein in the recovered state the first layer and the second layer maintain the structural integrity.

9. The apparatus of claim 8, wherein the structural integrity corresponds to a certain function or functions while the first layer and the second layer are aligned and are used in the first non-damaged state, wherein in the recovered state, the first and second layer are aligned and are to cooperate to maintain the certain function or functions, and wherein the first and second layers respectively include at least one other material from among: a carbon nanotube, a nanowire, and another polymer nanostructure.

10. The apparatus of claim 1, wherein the first layer and the second layer are immediately-adjacent layers among the plurality of immiscible polymer layers, wherein the first layer and the second layer, collectively, manifest structural integrity corresponding to a certain function while being used in a first non-damaged state in which the first and second layer are aligned and not damaged, and manifest a recovered state in which the first layer and the second layer manifest the structural integrity and the certain function while the first layer and the second layer are aligned and are being used as in the first non-damaged state.

11. The apparatus of claim 1, further including an electronics appliance including the plurality of immiscible polymer layers, wherein the plurality of immiscible polymer layers enable the appliance to manifest a degree of softness, and wherein certain of the immiscible polymer layers, integrated with or forming at least part of the first layer and the second layer, are characterized by having a common backbone and at least one of: different dynamic bonds, and different arrangements of dynamic bonds.

12. The apparatus of claim 11, wherein the electronic appliance is at least part of one or more of the following types of appliances: soft robotics equipment, one or more surgical modeling films and coatings, an implantable flexible electronics device, and a wearable flexible electronics device.

13. The apparatus of claim 1, wherein the plurality of immiscible polymer layers are configured as at least a part of a thin film capacitor having conductive and insulating composite layers.

14. The apparatus of claim 1, wherein at least one of the first layer and the second layer includes an immiscible backbone polymer that is amorphous with certain glass transition temperatures and that mitigates or prevents nanoscale aggregation.

15. The apparatus of claim 1, wherein certain of the immiscible polymer layers, integrated with or forming at least part of the first layer and the second layer, are characterized by having a common backbone and at least one of: different dynamic bonds, and different arrangements of dynamic bonds.

16. An apparatus comprising:

a plurality of immiscible polymer layers, among which are a first layer and a second layer integrated with one another to form a self-healing laminate characterized in that polymer material in the first layer and polymer material in the second layer are cooperatively capable of recovering from at least one of the first layer and second layer being misaligned by autonomously recovering from being misaligned and from at least one of the first layer and second layer being damaged, wherein the self-healing laminate is configured to act as a portion of electronic skin or as a cover for human skin or tissue.

17. The apparatus of claim 16, wherein the plurality of immiscible polymer layers are part of a multi-layer patch configured with attributes of having sufficient interfacial adhesive energy and of having an ability for being dis-assembled, and in response to being dis-assembled, self-heal.

18. A method comprising:

providing a plurality of immiscible polymer layers including a first layer and a second layer integrated with one another to form a self-healing laminate; and using the self-healing laminate in an environment that subjects at least one of the first layer and second layer to being misaligned and continuing to use the self-healing laminate in response to the self-healing laminate autonomously recovering from being misaligned, wherein the self-healing laminate is to act as a portion of electronic skin or as a cover for human skin or tissue.

19. A method comprising:

providing a plurality of immiscible polymer layers including a first layer and a second layer integrated with one another to form a self-healing laminate; and using the self-healing laminate in an environment that subjects at least one of the first layer and second layer to being misaligned and continuing to use the self-healing laminate in response to the self-healing laminate autonomously recovering from being misaligned, wherein the self-healing laminate autonomously recovering from being misaligned occurs in a state of manufacture of the plurality of immiscible polymer layers.

20. The method of claim 18, wherein the environment subjects at least one of the first layer and second layer to being damaged, and continuing to use the self-healing laminate includes use of the self-healing laminate after the self-healing laminate autonomously recovers from being damaged.

21. The method of claim 18, wherein the first layer and the second layer, are characterized by having respectively different immiscible backbones.

* * * * *